United States Patent
Sato et al.

(10) Patent No.: US 10,594,341 B2
(45) Date of Patent: Mar. 17, 2020

(54) HIGH-FREQUENCY-SIGNAL TRANSCEIVER CIRCUIT

(71) Applicant: Murata Manufacturing Co., Ltd., Kyoto (JP)

(72) Inventors: Tsuyoshi Sato, Kyoto (JP); Hidetoshi Matsumoto, Kyoto (JP); Kiichiro Takenaka, Kyoto (JP); Masahiro Ito, Kyoto (JP); Satoshi Tanaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/274,391

(22) Filed: Feb. 13, 2019

(65) Prior Publication Data
US 2019/0253086 A1    Aug. 15, 2019

(30) Foreign Application Priority Data

Feb. 13, 2018  (JP) ................................. 2018-023358
Dec. 10, 2018  (JP) ................................. 2018-231057

(51) Int. Cl.
H04B 1/00        (2006.01)
H04J 3/22        (2006.01)

(52) U.S. Cl.
CPC .......... H04B 1/0057 (2013.01); H04B 1/006 (2013.01); H04B 1/0064 (2013.01); H04J 3/22 (2013.01)

(58) Field of Classification Search
CPC .............................. H04B 1/0057; H04B 1/006
See application file for complete search history.

(56) References Cited

U.S. PATENT DOCUMENTS

2011/0159823 A1*  6/2011  Lo ........................ H04B 1/005
                                                                    455/78
2017/0251474 A1*  8/2017  Khlat ................... H04B 1/0092

* cited by examiner

*Primary Examiner* — Tuan H Nguyen
(74) *Attorney, Agent, or Firm* — Pearne & Gordon LLP

(57) ABSTRACT

A high-frequency-signal transceiver circuit transmits and receives a signal between first to sixth antenna terminals and terminals near a high-frequency circuit. The high-frequency-signal transceiver circuit includes first to sixth circuits connected to the corresponding first to sixth antenna terminals. One of the first to sixth circuits transmits and receives only a signal of time division multiplexing communication.

13 Claims, 14 Drawing Sheets

HIGH-FREQUENCY-SIGNAL TRANSCEIVER CIRCUIT

This application claims priority from Japanese Patent Application No. 2018-023358 filed on Feb. 13, 2018 and Japanese Patent Application No. 2018-231057 filed on Dec. 10, 2018. The content of these applications are incorporated herein by reference in its entirety.

BACKGROUND OF THE DISCLOSURE

1. Field of the Disclosure

The present disclosure relates to a high-frequency-signal transceiver circuit.

2. Description of the Related Art

In a mobile communication device such as a cellular phone device or a smart phone, a front-end circuit is disposed between an antenna and a RFIC (Radio Frequency Integrated Circuit).

A radio-frequency front-end circuit is disclosed in U.S. Patent Application Publication No. 2017/0251474.

BRIEF SUMMARY OF THE DISCLOSURE

Currently, third generation mobile communication systems (for example, W-CDMA, UMTS, and CDMA2000 1×) and fourth generation mobile communication systems (for example, LTE (Long Term Evolution) and LTE-Advanced) are utilized.

In a 3GPP TSG RAN Plenary (Third Generation Partnership Project, Technical Specification Group, Radio Access Network Plenary) meeting in December 2017, the first edition of a 5G NR (New Radio) standard specification was completed. As a result, mobile communication devices conforming to 5G NR (also referred below to as "5GNR") are presumably developed.

Consequently, there is a need for front-end circuits that are disposed between antennas and 5GNR RFICs. The coexistence with existing communication systems is a prerequisite of the front-end circuits. That is, it is necessary for mobile communication devices such as smart phones to be equipped with plural communication systems, and the size of the front-end circuits needs to be decreased.

The present disclosure has been accomplished in view of the above description, and an object of the present disclosure is to decrease the size.

According to preferred embodiments of the present disclosure, a high-frequency-signal transceiver circuit transmits and receives a signal between first to sixth antenna terminals and terminals connected to a high-frequency circuit. The high-frequency-signal transceiver circuit includes first to sixth circuits connected to the corresponding first to sixth antenna terminals. One of the first to sixth circuits transmits and receives only a signal of time division multiplexing communication.

According to preferred embodiments of the present disclosure, the size can be decreased.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

High-frequency-signal transceiver circuits according to embodiments of the present disclosure will hereinafter be described in detail with reference to the drawings. The present disclosure is not limited to the embodiments. The embodiments will be described by way of example. It goes without saying that the features described according to the different embodiments can be partially replaced or combined.

First Embodiment

Figure 1:
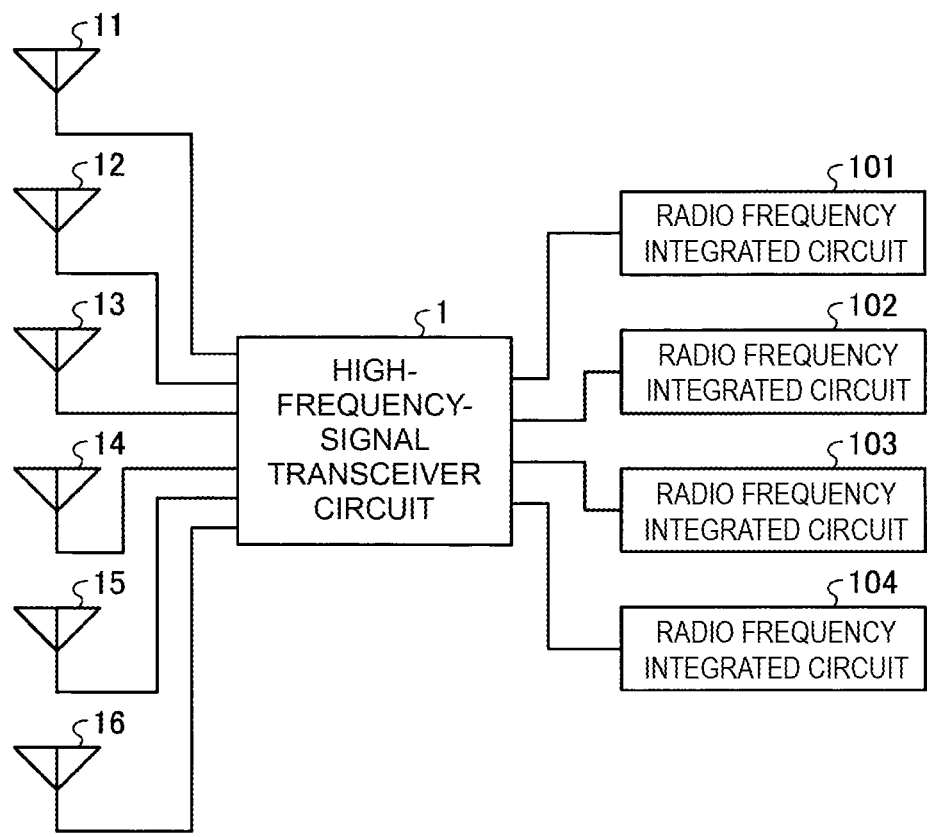
FIG. 1 illustrates a circuit including a high-frequency-signal transceiver circuit according to a first embodiment.

FIG. 1 illustrates a circuit including a high-frequency-signal transceiver circuit according to a first embodiment. A high-frequency-signal transceiver circuit 1 is a front-end circuit that is disposed between a first antenna 11 to a sixth antenna 16 and radio frequency integrated circuits (RFICs) 101 to 104 in a mobile communication device such as a cellular phone device or a smart phone. In the following description, the radio frequency integrated circuits 101 to 104 are referred to as the RFICs 101 to 104.

The RFIC 101 transmits and receives a LTE (Long Term Evolution) high-frequency signal. The RFIC 102 transmits and receives a 5GNR high-frequency signal. The RFIC 103 transmits and receives a WiFi (IEEE (The Institute of Electrical and Electronics Engineers, Inc.) 802.11) high-frequency signal. The RFIC 104 transmits and receives a GPS (Global Positioning System) high-frequency signal. The RFICs 101 to 104 may be integrated into a single radio frequency integrated circuit. The RFICs 101 to 104 correspond to a "high-frequency circuit" according to the present disclosure.

Figure 2:
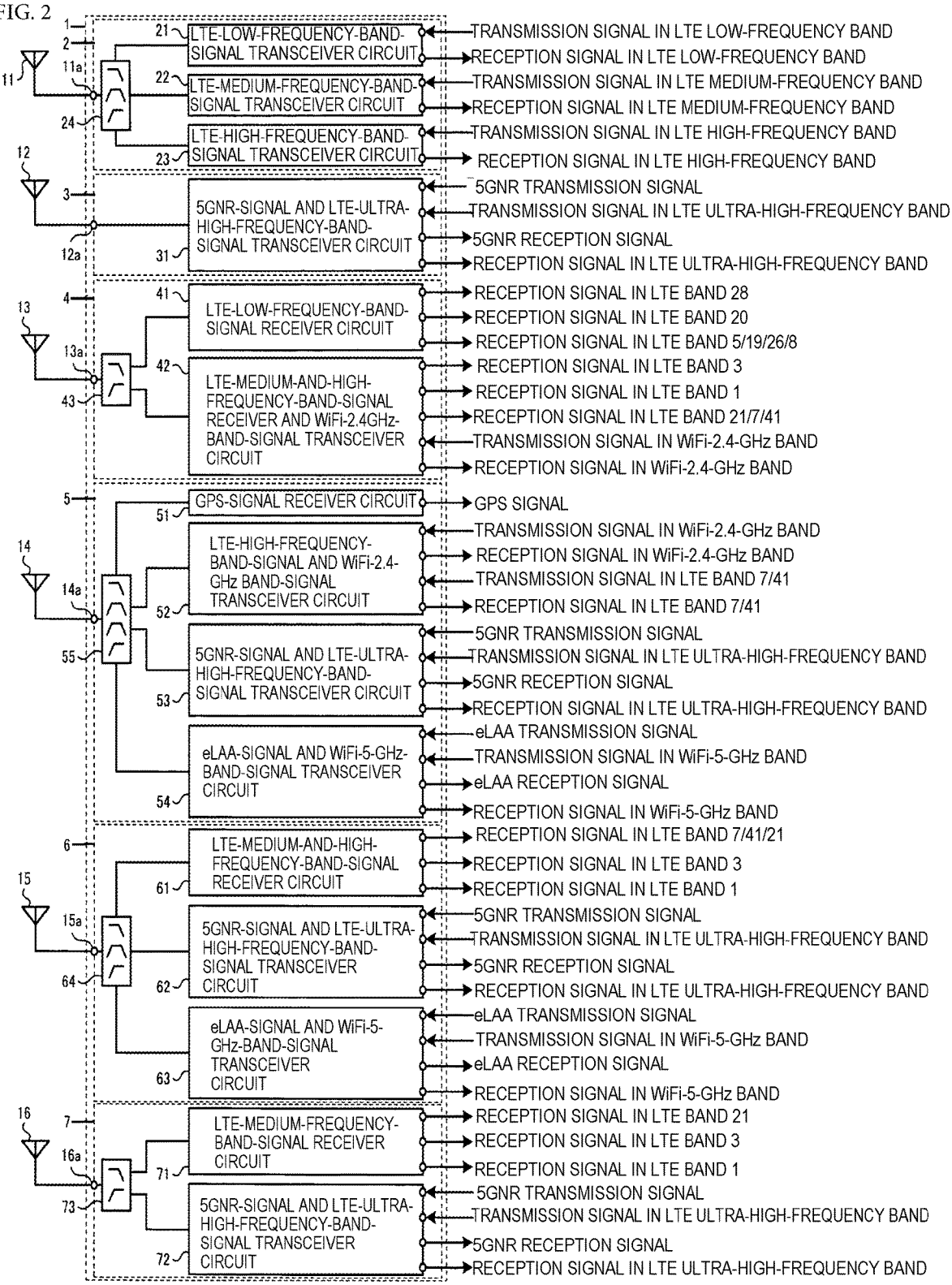
FIG. 2 illustrates the structure of the high-frequency-signal transceiver circuit according to the first embodiment.

FIG. 2 illustrates the structure of the high-frequency-signal transceiver circuit according to the first embodiment. The high-frequency-signal transceiver circuit 1 can be formed on another integrated circuit (IC) that differs from the RFICs 101 to 104, and the integrated circuit (IC) can be mounted on a printed circuit board. A first antenna terminal 11a to a sixth antenna terminal 16a may be disposed on the printed circuit board. The first antenna 11 to the sixth antenna 16 may be mounted on the printed circuit board. The RFICs 101 to 104 may be mounted on the printed circuit board.

The high-frequency-signal transceiver circuit 1 includes a first circuit 2 that transmits and receives a high-frequency signal between the first antenna terminal 11a and terminals connected to the RFICs 101 and 102.

The high-frequency-signal transceiver circuit 1 includes a second circuit 3 that transmits and receives a high-frequency signal between the second antenna terminal 12a and terminals connected to the RFICs 101 to 103.

The high-frequency-signal transceiver circuit 1 includes a third circuit 4 that transmits and receives a high-frequency signal between the third antenna terminal 13a and terminals connected to the RFICs 101 to 104.

The high-frequency-signal transceiver circuit 1 includes a fourth circuit 5 that transmits and receives a high-frequency signal between the fourth antenna terminal 14a and terminals connected to the RFICs 101 to 103. The fourth circuit 5 may be capable of transmitting and receiving a high-frequency signal between the fourth antenna terminal 14a and a RFIC of a satellite positioning system such as GLONASS, Galileo, the BeiDou satellite positioning system, or the quasi-zenith satellite system.

The high-frequency-signal transceiver circuit 1 includes a fifth circuit 6 that transmits and receives a high-frequency signal between the fifth antenna terminal 15a and terminals connected to the RFICs 101 to 103.

The high-frequency-signal transceiver circuit 1 includes a sixth circuit 7 that transmits and receives a high-frequency signal between the sixth antenna terminal 16a and terminals connected to the RFICs 101 and 102.

The first circuit 2 includes a LTE-low-frequency-band-signal transceiver circuit 21, a LTE-medium-frequency-band-signal transceiver circuit 22, a LTE-high-frequency-band-signal transceiver circuit 23, and a multiplexer 24.

According to the first embodiment, each transceiver circuit may be divided into a transmitter circuit and a receiver circuit.

According to the first embodiment, a LTE low-frequency band includes LTE bands 28, 20, 5, 19, 26, and 8. The present disclosure, however, is not limited thereto.

The LTE band 28 is used for frequency division multiplexing communication (Frequency Division Duplex, or FDD) in which an uplink (transmission) frequency ranges from about 703 MHz to about 748 MHz, and a downlink (reception) frequency ranges from about 758 MHz to about 803 MHz.

The LTE band 20 is used for FDD in which the transmission frequency ranges from about 832 MHz to about 862 MHz, and the reception frequency ranges from about 791 MHz to about 821 MHz.

The LTE band 5 is used for FDD in which the transmission frequency ranges from about 824 MHz to about 849 MHz, and the reception frequency ranges from about 869 MHz to about 894 MHz.

The LTE band 19 is used for FDD in which the transmission frequency ranges from about 830 MHz to about 845 MHz, and the reception frequency ranges from about 875 MHz to about 890 MHz.

The LTE band 26 is used for FDD in which the transmission frequency ranges from about 814 MHz to about 849 MHz, and the reception frequency ranges from about 859 MHz to about 894 MHz.

The LTE band 8 is used for FDD in which the transmission frequency ranges from about 880 MHz to about 915 MHz, and the reception frequency ranges from about 925 MHz to about 960 MHz.

According to the first embodiment, a LTE medium-frequency band includes LTE bands 21, 3, and 1. The present disclosure, however, is not limited thereto.

The LTE band 21 is used for FDD in which the transmission frequency ranges from about 1447.9 MHz to about 1462.9 MHz, and the reception frequency ranges from about 1495.9 MHz to about 1510.9 MHz.

The LTE band 3 is used for FDD in which the transmission frequency ranges from about 1710 MHz to about 1785 MHz, and the reception frequency ranges from about 1805 MHz to about 1880 MHz.

The LTE band 1 is used for FDD in which the transmission frequency ranges from about 1920 MHz to about 1980 MHz, and the reception frequency ranges from about 2110 MHz to about 2170 MHz.

According to the first embodiment, a LTE high-frequency band includes LTE bands 7 and 41. The present disclosure, however, is not limited thereto.

The LTE band 7 is used for FDD in which the transmission frequency ranges from about 2500 MHz to about 2570 MHz, and the reception frequency ranges from about 2620 MHz to about 2690 MHz.

The LTE band 41 is used for time division multiplexing communication (Time Division Duplex, or TDD) in which the transmission and reception frequencies range from about 2496 MHz to about 2690 MHz.

The multiplexer 24 is a 1-to-3 triplexer. The multiplexer 24 electrically connects the first antenna terminal 11a and circuits such as the LTE-low-frequency-band-signal transceiver circuit 21, the LTE-medium-frequency-band-signal transceiver circuit 22, and the LTE-high-frequency-band-signal transceiver circuit 23 to each other.

The multiplexer 24 includes a low pass filter, a band pass filter, and a high pass filter. The low pass filter passes a signal in the LTE low-frequency band. The band pass filter passes a signal in the LTE medium-frequency band. The high pass filter passes a signal in the LTE high-frequency band.

The LTE-low-frequency-band-signal transceiver circuit 21 receives a transmission signal in the LTE low-frequency band from the RFIC 101 and outputs the signal to the first antenna terminal 11a via the low pass filter of the multiplexer 24. The LTE-low-frequency-band-signal transceiver circuit 21 receives a reception signal in the LTE low-frequency band from the first antenna terminal 11a via the low pass filter of the multiplexer 24 and outputs the signal to the RFIC 101.

The LTE-medium-frequency-band-signal transceiver circuit 22 receives a transmission signal in the LTE medium-frequency band from the RFIC 101 and outputs the signal to the first antenna terminal 11a via the band pass filter of the multiplexer 24. The LTE-medium-frequency-band-signal transceiver circuit 22 receives a reception signal in the LTE medium-frequency band from the first antenna terminal 11a via the band pass filter of the multiplexer 24 and outputs the signal to the RFIC 101.

The LTE-high-frequency-band-signal transceiver circuit 23 receives a transmission signal in the LTE high-frequency band from the RFIC 101 and outputs the signal to the first antenna terminal 11a via the high pass filter of the multiplexer 24. The LTE-high-frequency-band-signal transceiver circuit 23 receives a reception signal in the LTE high-frequency band from the first antenna terminal 11a via the high pass filter of the multiplexer 24 and outputs the signal to the RFIC 101.

The second circuit 3 includes a 5GNR-signal and LTE-ultra-high-frequency-band-signal transceiver circuit 31.

According to the first embodiment, a 5GNR includes TDD in a 3.5 GHz band including about 3.3 GHz to about 4.2 GHz, a 3.5 GHz band including about 3.3 GHz to about 3.8 GHz, and a 4.5 GHz band including about 4.5 GHz to about 4.99 GHz. The present disclosure, however, is not limited thereto.

According to the first embodiment, a LTE ultra-high-frequency band includes a LTE band 42. The present disclosure, however, is not limited thereto.

The LTE band 42 is used for TDD in which the transmission and reception frequencies range from about 3400 MHz to about 3600 MHz.

The 5GNR-signal and LTE-ultra-high-frequency-band-signal transceiver circuit 31 receives a 5GNR transmission signal from the RFIC 102 and outputs the signal to the second antenna terminal 12a. The 5GNR-signal and LTE-ultra-high-frequency-band-signal transceiver circuit 31 receives a transmission signal in the LTE ultra-high-frequency band from the RFIC 101 and outputs the signal to the second antenna terminal 12a.

The 5GNR-signal and LTE-ultra-high-frequency-band-signal transceiver circuit 31 receives a 5GNR reception signal from the second antenna terminal 12a and outputs the signal to the RFIC 102. The 5GNR-signal and LTE-ultra-high-frequency-band-signal transceiver circuit 31 receives a reception signal in the LTE ultra-high-frequency band from the second antenna terminal 12a and outputs the signal to the RFIC 101.

The third circuit 4 includes a LTE-low-frequency-band-signal receiver circuit 41, a LTE-medium-and-high-frequency-band-signal receiver and WiFi-2.4-GHz-band-signal transceiver circuit 42, and a multiplexer 43.

The multiplexer 43 is a 1-to-2 diplexer. The multiplexer 43 electrically connects the third antenna terminal 13a and circuits such as the LTE-low-frequency-band-signal receiver circuit 41 and the LTE-medium-and-high-frequency-band-signal receiver and WiFi-2.4-GHz-band-signal transceiver circuit 42 to each other. A combination of a low pass filter and a high pass filter is referred here to as the diplexer.

A WiFi-2.4-GHz band includes CSMA/CA (Carrier Sense Multiple Access with Collision Avoidance) the center frequency of which ranges from about 2412 MHz to about 2484 MHz. The present disclosure, however, is not limited thereto.

The multiplexer 43 includes a low pass filter and a high pass filter. The low pass filter passes a signal in the LTE low-frequency band. The high pass filter passes a signal in the LTE medium-and-high-frequency band and a signal in the WiFi-2.4-GHz band.

The LTE-low-frequency-band-signal receiver circuit 41 receives a reception signal in the LTE low-frequency band from the third antenna terminal 13a via the low pass filter of the multiplexer 43 and outputs the signal to the RFIC 101.

The LTE-medium-and-high-frequency-band-signal receiver and WiFi-2.4-GHz-band-signal transceiver circuit 42 receives a reception signal in the LTE medium-and-high-frequency band from the third antenna terminal 13a via the high pass filter of the multiplexer 43 and outputs the signal to the RFIC 101.

The LTE-medium-and-high-frequency-band-signal receiver and WiFi-2.4-GHz-band-signal transceiver circuit 42 receives a transmission signal in the WiFi-2.4-GHz band from the RFIC 103 and outputs the signal to the third antenna terminal 13a via the high pass filter of the multiplexer 43. The LTE-medium-and-high-frequency-band-signal receiver and WiFi-2.4-GHz-band-signal transceiver circuit 42 receives a reception signal in the WiFi-2.4-GHz band from the third antenna terminal 13a via the high pass filter of the multiplexer 43 and outputs the signal to the RFIC 103.

The fourth circuit 5 includes a GPS-signal receiver circuit 51, a LTE-high-frequency-band-signal and WiFi-2.4-GHz-band-signal transceiver circuit 52, a 5GNR-signal and LTE-ultra-high-frequency-band-signal transceiver circuit 53, an eLAA-signal and WiFi-5-GHz-band-signal transceiver circuit 54, and a multiplexer 55.

According to the first embodiment, a GPS signal includes about 1575.42 MHz in an L1 band. The present disclosure, however, is not limited thereto.

The eLAA (enhanced Licensed Assisted Access) is a technique for LTE communication in a frequency band for which a license is not required. According to the embodiment, an eLAA band and a WiFi-5-GHz band include a center frequency ranging from about 5180 MHz to about 5825 MHz. The present disclosure, however, is not limited thereto.

The multiplexer 55 is a 1-to-4 quadplexer. The multiplexer 55 electrically connects the fourth antenna terminal 14a and circuits such as the GPS-signal receiver circuit 51, the LTE-high-frequency-band-signal and WiFi-2.4-GHz-band-signal transceiver circuit 52, the 5GNR-signal and LTE-ultra-high-frequency-band-signal transceiver circuit 53, and the eLAA-signal and WiFi-5-GHz-band-signal transceiver circuit 54 to each other.

The multiplexer 55 includes a low pass filter, a first band pass filter, a second band pass filter, and a high pass filter. The low pass filter passes a GPS signal. The first band pass filter passes a signal in the LTE high-frequency band and a signal in the WiFi-2.4-GHz band. The second band pass filter passes a 5GNR signal and a signal in the LTE ultra-high-frequency band. The high pass filter passes an eLAA signal and a signal in the WiFi-5-GHz band.

The GPS-signal receiver circuit 51 receives a GPS signal from the fourth antenna terminal 14a via the low pass filter of the multiplexer 55 and outputs the signal to a GPS RFIC. The GPS-signal receiver circuit 51 may be capable of receiving a signal of a satellite positioning system such as GLONASS, Galileo, the BeiDou satellite positioning system, or the quasi-zenith satellite system.

The LTE-high-frequency-band-signal and WiFi-2.4-GHz-band-signal transceiver circuit 52 receives a transmission signal in the WiFi-2.4-GHz band from the RFIC 103 and outputs the signal to the fourth antenna terminal 14a via the first band pass filter of the multiplexer 55. The LTE-high-frequency-band-signal and WiFi-2.4-GHz-band-signal transceiver circuit 52 receives a reception signal in the WiFi-2.4-GHz band from the fourth antenna terminal 14a via the first band pass filter of the multiplexer 55 and outputs the signal to a WiFi RFIC.

The LTE-high-frequency-band-signal and WiFi-2.4-GHz-band-signal transceiver circuit 52 receives a transmission signal in the LTE high-frequency band from the RFIC 101 and outputs the signal to the fourth antenna terminal 14a via the first band pass filter of the multiplexer 55. The LTE-high-frequency-band-signal and WiFi-2.4-GHz-band-signal transceiver circuit 52 receives a reception signal in the LTE high-frequency band from the fourth antenna terminal 14a via the first band pass filter of the multiplexer 55 and outputs the signal to the RFIC 101.

The 5GNR-signal and LTE-ultra-high-frequency-band-signal transceiver circuit 53 receives a 5GNR transmission signal from the RFIC 102 and outputs the signal to the fourth antenna terminal 14a via the second band pass filter of the multiplexer 55. The 5GNR-signal and LTE-ultra-high-frequency-band-signal transceiver circuit 53 receives a transmission signal in the LTE ultra-high-frequency band from the RFIC 101 and outputs the signal to the fourth antenna terminal 14a via the second band pass filter of the multiplexer 55.

The 5GNR-signal and LTE-ultra-high-frequency-band-signal transceiver circuit 53 receives a 5GNR reception signal from the fourth antenna terminal 14a via the second band pass filter of the multiplexer 55 and outputs the signal to the RFIC 102. The 5GNR-signal and LTE-ultra-high-frequency-band-signal transceiver circuit 53 receives a reception signal in the LTE ultra-high-frequency band from the fourth antenna terminal 14a via the second band pass filter of the multiplexer 55 and outputs the signal to the RFIC 101.

The eLAA-signal and WiFi-5-GHz-band-signal transceiver circuit 54 receives an eLAA transmission signal from the RFIC 101 and outputs the signal to the fourth antenna terminal 14a via the high pass filter of the multiplexer 55. The eLAA-signal and WiFi-5-GHz-band-signal transceiver circuit 54 receives a transmission signal in the WiFi-5-GHz band from the RFIC 103 and outputs the signal to the fourth antenna terminal 14a via the high pass filter of the multiplexer 55.

The eLAA-signal and WiFi-5-GHz-band-signal transceiver circuit 54 receives an eLAA reception signal from the fourth antenna terminal 14a via the high pass filter of the multiplexer 55 and outputs the signal to the RFIC 101. The eLAA-signal and WiFi-5-GHz-band-signal transceiver circuit 54 receives a reception signal in the WiFi-5-GHz band from the fourth antenna terminal 14a via the high pass filter of the multiplexer 55 and outputs the signal to the RFIC 103.

The fifth circuit 6 includes a LTE-medium-and-high-frequency-band-signal receiver circuit 61, a 5GNR-signal and LTE-ultra-high-frequency-band-signal transceiver circuit 62, an eLAA-signal and WiFi-5-GHz-band-signal transceiver circuit 63, and a multiplexer 64.

The multiplexer 64 electrically connects the fifth antenna terminal 15a and circuits such as the LTE-medium-and-high-frequency-band-signal receiver circuit 61, the 5GNR-signal and LTE-ultra-high-frequency-band-signal transceiver circuit 62, and the eLAA-signal and WiFi-5-GHz-band-signal transceiver circuit 63 to each other.

The multiplexer 64 is a 1-to-3 triplexer. The multiplexer 64 includes a low pass filter, a band pass filter, and a high pass filter. The low pass filter passes a signal in the LTE medium-and-high-frequency band. The band pass filter passes a 5GNR signal and a signal in the LTE ultra-high-frequency band. The high pass filter passes an eLAA signal and a signal in the WiFi-5-GHz band.

The LTE-medium-and-high-frequency-band-signal receiver circuit 61 receives a reception signal in the LTE medium-and-high-frequency band from the fifth antenna terminal 15a via the low pass filter of the multiplexer 64 and outputs the signal to the RFIC 101.

The 5GNR-signal and LTE-ultra-high-frequency-band-signal transceiver circuit 62 receives a 5GNR transmission signal from the RFIC 102 and outputs the signal to the fifth antenna terminal 15a via the band pass filter of the multiplexer 64. The 5GNR-signal and LTE-ultra-high-frequency-band-signal transceiver circuit 62 receives a transmission signal in the LTE ultra-high-frequency band from the RFIC 101 and outputs the signal to the fifth antenna terminal 15a via the band pass filter of the multiplexer 64.

The 5GNR-signal and LTE-ultra-high-frequency-band-signal transceiver circuit 62 receives a 5GNR reception signal from the fifth antenna terminal 15a via the band pass filter of the multiplexer 64 and outputs the signal to the RFIC 102. The 5GNR-signal and LTE-ultra-high-frequency-band-signal transceiver circuit 62 receives a reception signal in the LTE ultra-high-frequency band from the fifth antenna terminal 15a via the band pass filter of the multiplexer 64 and outputs the signal to the RFIC 101.

The eLAA-signal and WiFi-5-GHz-band-signal transceiver circuit 63 receives an eLAA transmission signal from the RFIC 101 and outputs the signal to the fifth antenna terminal 15a via the high pass filter of the multiplexer 64. The eLAA-signal and WiFi-5-GHz-band-signal transceiver circuit 63 receives a transmission signal in the WiFi-5-GHz band from the RFIC 103 and outputs the signal to the fifth antenna terminal 15a via the high pass filter of the multiplexer 64.

The eLAA-signal and WiFi-5-GHz-band-signal transceiver circuit 63 receives an eLAA reception signal from the fifth antenna terminal 15a via the high pass filter of the multiplexer 64 and outputs the signal to the RFIC 101. The eLAA-signal and WiFi-5-GHz-band-signal transceiver circuit 63 receives a reception signal in the WiFi-5-GHz band from the fifth antenna terminal 15a via the high pass filter of the multiplexer 64 and outputs the signal to the RFIC 103.

The sixth circuit 7 includes a LTE-medium-frequency-band-signal receiver circuit 71 and a 5GNR-signal and LTE-ultra-high-frequency-band-signal transceiver circuit 72, and a multiplexer 73.

The multiplexer 73 electrically connects the sixth antenna terminal 16a and circuits such as the LTE-medium-frequency-band-signal receiver circuit 71 and the 5GNR-signal and LTE-ultra-high-frequency-band-signal transceiver circuit 72 to each other.

The multiplexer 73 is a 1-to-2 diplexer. The multiplexer 73 includes a low pass filter and a high pass filter. The low pass filter passes a signal in the LTE medium-frequency band. The high pass filter passes a 5GNR signal and a signal in the LTE ultra-high-frequency band.

The LTE-medium-frequency-band-signal receiver circuit 71 receives a reception signal in the LTE medium-frequency band from the sixth antenna terminal 16a via the low pass filter of the multiplexer 73 and outputs the signal to the RFIC 101.

The 5GNR-signal and LTE-ultra-high-frequency-band-signal transceiver circuit 72 receives a 5GNR transmission signal from the RFIC 102 and outputs the signal to the sixth antenna terminal 16a via the high pass filter of the multiplexer 73. The 5GNR-signal and LTE-ultra-high-frequency-band-signal transceiver circuit 72 receives a transmission signal in the LTE ultra-high-frequency band from the RFIC 101 and outputs the signal to the sixth antenna terminal 16a via the high pass filter of the multiplexer 73.

The 5GNR-signal and LTE-ultra-high-frequency-band-signal transceiver circuit 72 receives a 5GNR reception signal from the sixth antenna terminal 16a via the high pass filter of the multiplexer 73 and outputs the signal to the RFIC 102. The 5GNR-signal and LTE-ultra-high-frequency-band-signal transceiver circuit 72 receives a reception signal in the LTE ultra-high-frequency band from the sixth antenna terminal 16a via the high pass filter of the multiplexer 73 and outputs the signal to the RFIC 101.

Figure 3:
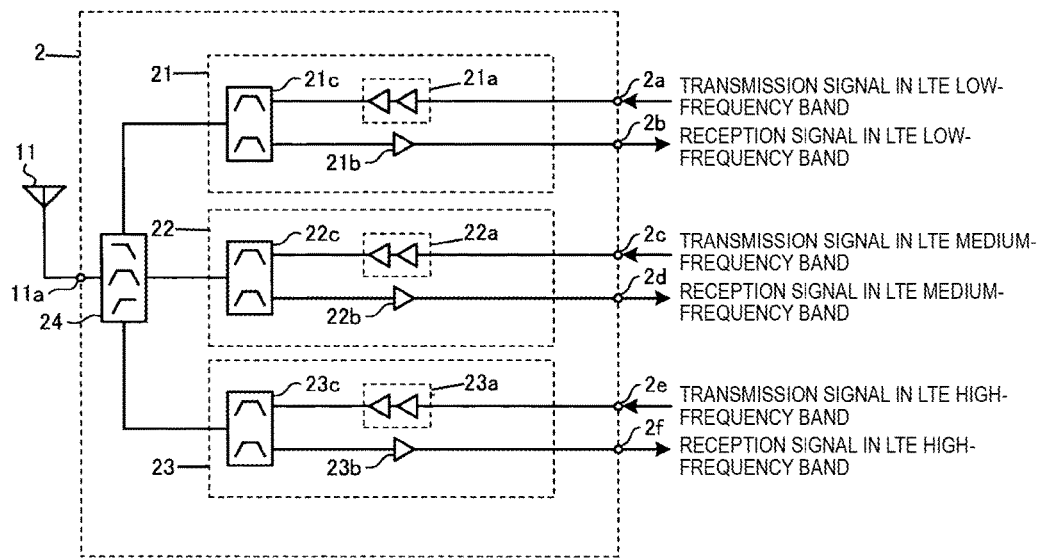
FIG. 3 illustrates the structure of a first circuit of the high-frequency-signal transceiver circuit according to the first embodiment.

FIG. 3 illustrates the structure of the first circuit of the high-frequency-signal transceiver circuit according to the first embodiment.

A set of the LTE-low-frequency-band-signal transceiver circuit 21, the LTE-medium-frequency-band-signal transceiver circuit 22, the LTE-high-frequency-band-signal transceiver circuit 23, and the multiplexer 24 is a single module. The present disclosure, however, is not limited thereto. The LTE-low-frequency-band-signal transceiver circuit 21, the LTE-medium-frequency-band-signal transceiver circuit 22, the LTE-high-frequency-band-signal transceiver circuit 23, and the multiplexer 24 may be different modules. In the module, one or more components are mounted on a substrate.

The LTE-low-frequency-band-signal transceiver circuit 21 includes a power amplifier 21a, a low-noise amplifier 21b, and a multiplexer 21c.

The power amplifier 21a is a two-stage amplifier. The present disclosure, however, is not limited thereto. The power amplifier 21a may be a single-stage amplifier or may be a three-or-more-stage amplifier. The same is true for the power amplifiers described later.

The multiplexer 21c is a 1-to-2 duplexer. The multiplexer 21c electrically connects the low pass filter of the multiplexer 24 and amplifiers such as the power amplifier 21a and the low-noise amplifier 21b to each other.

The multiplexer 21c includes a first band pass filter and a second band pass filter. The first band pass filter passes a transmission signal in the LTE low-frequency band. The second band pass filter passes a reception signal in the LTE low-frequency band.

The power amplifier 21a receives the transmission signal in the LTE low-frequency band from the RFIC 101 via a terminal 2a and outputs the signal to the first band pass filter of the multiplexer 21c.

The low-noise amplifier 21b receives the reception signal in the LTE low-frequency band from the second band pass filter of the multiplexer 21c and outputs the signal to the RFIC 101 via a terminal 2b.

The LTE-medium-frequency-band-signal transceiver circuit 22 includes a power amplifier 22a, a low-noise amplifier 22b, and a multiplexer 22c.

The multiplexer 22c is a 1-to-2 duplexer. The multiplexer 22c electrically connects the band pass filter of the multiplexer 24 and amplifiers such as the power amplifier 22a and the low-noise amplifier 22b to each other.

The multiplexer 22c includes a first band pass filter and a second band pass filter. The first band pass filter passes a transmission signal in the LTE medium-frequency band. The second band pass filter passes a reception signal in the LTE medium-frequency band.

The power amplifier 22a receives the transmission signal in the LTE medium-frequency band from the RFIC 101 via a terminal 2c and outputs the signal to the first band pass filter of the multiplexer 22c.

The low-noise amplifier 22b receives the reception signal in the LTE medium-frequency band from the second band pass filter of the multiplexer 22c and outputs the signal to the RFIC 101 via a terminal 2d.

The LTE-high-frequency-band-signal transceiver circuit 23 includes a power amplifier 23a, a low-noise amplifier 23b, and a multiplexer 23c.

The multiplexer 23c is a 1-to-2 duplexer. The multiplexer 23c electrically connects the high pass filter of the multiplexer 24 and amplifiers such as the power amplifier 23a and the low-noise amplifier 23b to each other.

The multiplexer 23c includes a first band pass filter and a second band pass filter. The first band pass filter passes a transmission signal in the LTE high-frequency band. The second band pass filter passes a reception signal in the LTE high-frequency band.

The power amplifier 23a receives the transmission signal in the LTE high-frequency band from the RFIC 101 via a terminal 2e and outputs the signal to the first band pass filter of the multiplexer 23c.

The low-noise amplifier 23b receives the reception signal in the LTE high-frequency band from the second band pass filter of the multiplexer 23c and outputs the signal to the RFIC 101 via a terminal 2f.

Figure 4:
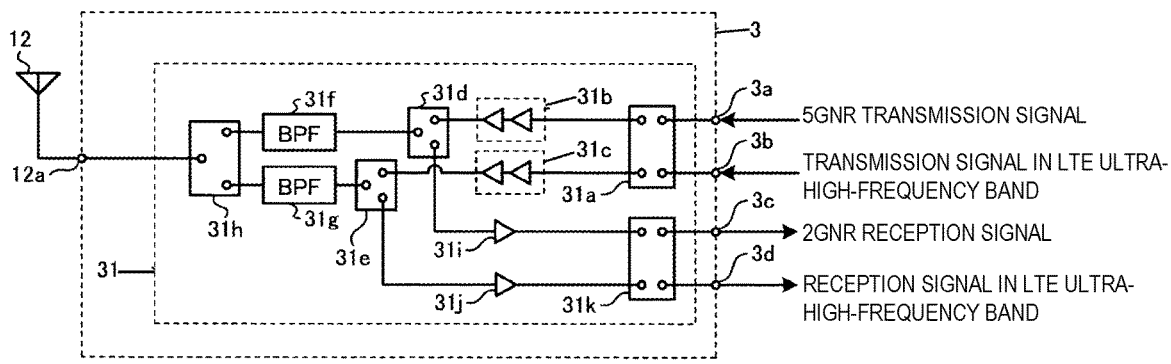
FIG. 4 illustrates the structure of a second circuit of the high-frequency-signal transceiver circuit according to the first embodiment.

FIG. 4 illustrates the structure of the second circuit of the high-frequency-signal transceiver circuit according to the first embodiment.

The 5GNR-signal and LTE-ultra-high-frequency-band-signal transceiver circuit 31 may be a module.

The 5GNR-signal and LTE-ultra-high-frequency-band-signal transceiver circuit 31 includes switches 31a, 31d, 31e, 31h, and 31k, power amplifiers 31b and 31c, band pass filters 31f and 31g, and low-noise amplifiers 31i and 31j.

The switches 31a and 31k are dual-port dual-throw switches. The switch 31d, 31e, and 31h are single-port dual-throw switches.

When a 4.5 to 4.99 GHz 5GNR signal is transmitted, the switch 31a electrically connects a terminal 3a and the power amplifier 31b to each other. The switch 31d electrically connects the power amplifier 31b and the band pass filter 31f to each other. The switch 31h electrically connects the band pass filter 31f and the second antenna 12 to each other. The power amplifier 31b receives the 4.5 to 4.99 GHz 5GNR transmission signal from the RFIC 102 via the terminal 3a and the switch 31a, amplifies the signal, and outputs the amplified 4.5 to 4.99 GHz 5GNR transmission signal to the band pass filter 31f via the switch 31d. The band pass filter 31f passes the 4.5 to 4.99 GHz 5GNR transmission signal amplified by the power amplifier 31b and outputs the signal to the second antenna terminal 12a via the switch 31h.

When a 3.3 to 4.2 GHz 5GNR signal is transmitted, the switch 31a electrically connects the terminal 3a and the power amplifier 31c to each other. The switch 31e electrically connects the power amplifier 31c and the band pass filter 31g to each other. The switch 31h electrically connects the band pass filter 31g and the second antenna terminal 12a to each other. The power amplifier 31c receives the 3.3 to 4.2 GHz 5GNR transmission signal from the RFIC 102 via the terminal 3a and the switch 31a, amplifies the signal, and outputs the amplified 3.3 to 4.2 GHz 5GNR transmission signal to the band pass filter 31g via the switch 31e. The band pass filter 31g passes the 3.3 to 4.2 GHz 5GNR transmission signal amplified by the power amplifier 31c and outputs the signal to the second antenna terminal 12a via the switch 31h.

When a signal in the LTE ultra-high-frequency band is transmitted, the switch 31a electrically connects a terminal 3b and the power amplifier 31c to each other. The switch 31e electrically connects the power amplifier 31c and the band pass filter 31g to each other. The switch 31h electrically connects the band pass filter 31g and the second antenna terminal 12a to each other. The power amplifier 31c receives the transmission signal in the LTE ultra-high-frequency band from the RFIC 102 via the terminal 3b and the switch 31a, amplifies the signal, and outputs the amplified transmission signal in the LTE ultra-high-frequency band to the band pass filter 31g via the switch 31e. The band pass filter 31g passes the transmission signal in the LTE ultra-high-frequency band amplified by the power amplifier 31c and outputs the signal to the second antenna terminal 12a via the switch 31h.

When a 4.5 to 4.99 GHz 5GNR signal is received, the switch 31h electrically connects the second antenna terminal 12a and the band pass filter 31f to each other. The switch 31d electrically connects the band pass filter 31f and the low-noise amplifier 31i to each other. The switch 31k electrically connects the low-noise amplifier 31i and a terminal 3c to each other. The band pass filter 31f receives the 4.5 to 4.99 GHz 5GNR reception signal from the second antenna terminal 12a via the switch 31h, passes the signal, and outputs the signal to the low-noise amplifier 31i via the switch 31d. The low-noise amplifier 31i amplifies the 4.5 to 4.99 GHz 5GNR reception signal, and outputs the amplified 4.5 to 4.99 GHz 5GNR reception signal to the RFIC 102 via the switch 31k and the terminal 3c.

When a 3.3 to 4.2 GHz 5GNR signal is received, the switch 31h electrically connects the second antenna terminal 12a and the band pass filter 31g to each other. The switch 31e electrically connects the band pass filter 31g and the low-noise amplifier 31j to each other. The switch 31k electrically connects the low-noise amplifier 31j and the terminal 3c to each other. The band pass filter 31g receives the 3.3 to 4.2 GHz 5GNR reception signal from the second antenna terminal 12a via the switch 31h, passes the signal, and outputs the signal to the low-noise amplifier 31j via the switch 31e. The low-noise amplifier 31j amplifies the 3.3 to 4.2 GHz 5GNR reception signal and outputs the amplified 3.3 to 4.2 GHz 5GNR reception signal to the RFIC 102 via the switch 31k and the terminal 3c.

When a signal in the LTE ultra-high-frequency band is received, the switch 31h electrically connects the second antenna terminal 12a and the band pass filter 31g to each other. The switch 31e electrically connects the band pass filter 31g and the low-noise amplifier 31j to each other. The switch 31k electrically connects the low-noise amplifier 31j and a terminal 3d to each other. The band pass filter 31g receives the reception signal in the LTE ultra-high-frequency band from the second antenna terminal 12a via the switch 31h, passes the signal, and outputs the signal to the low-noise amplifier 31j via the switch 31e. The low-noise amplifier 31j amplifies the reception signal in the LTE ultra-high-frequency band and outputs the amplified reception signal in the LTE ultra-high-frequency band to the RFIC 101 via the switch 31k and the terminal 3d.

Figure 5:
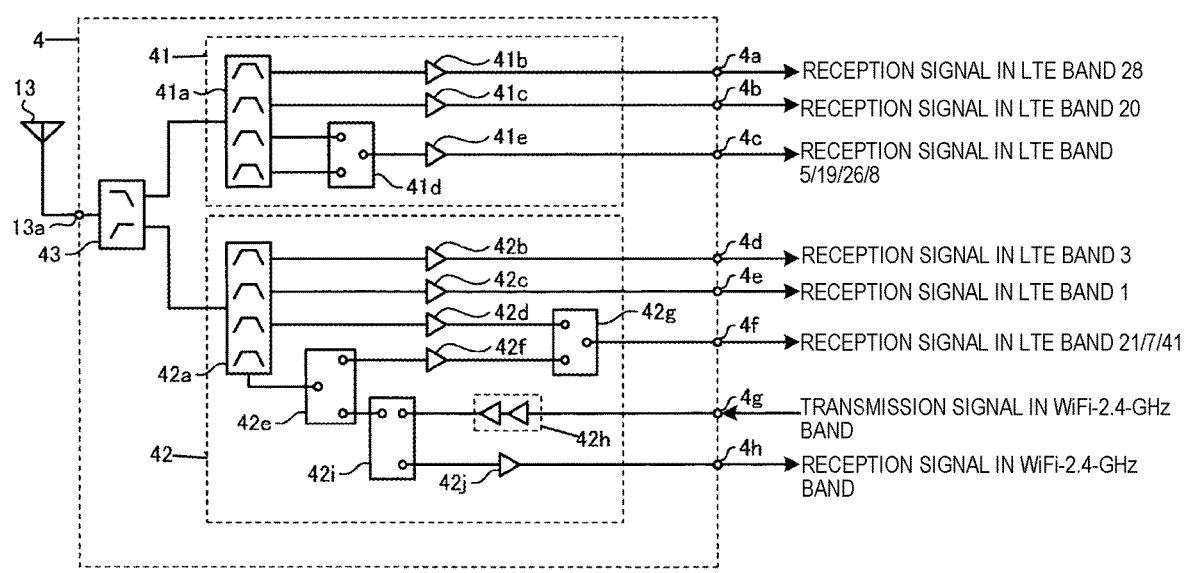
FIG. 5 illustrates the structure of a third circuit of the high-frequency-signal transceiver circuit according to the first embodiment.

FIG. 5 illustrates the structure of the third circuit of the high-frequency-signal transceiver circuit according to the first embodiment.

A set of the LTE-low-frequency-band-signal receiver circuit 41, the LTE-medium-and-high-frequency-band-signal receiver and WiFi-2.4-GHz-band-signal transceiver circuit 42, and the multiplexer 43 is a single module. The present disclosure, however, is not limited thereto. The LTE-low-frequency-band-signal receiver circuit 41, the LTE-medium-and-high-frequency-band-signal receiver and WiFi-2.4-GHz-band-signal transceiver circuit 42, and the multiplexer 43 may be different modules.

The LTE-low-frequency-band-signal receiver circuit 41 includes a multiplexer 41a, low-noise amplifiers 41b, 41c, and 41e, and a switch 41d.

The multiplexer 41a is a 1-to-4 quadplexer. The multiplexer 41a electrically connects the low pass filter of the multiplexer 43 and the low-noise amplifiers 41b and 41c to each other and electrically connects the low pass filter of the multiplexer 43 and the switch 41d to each other.

The multiplexer 41a includes a first band pass filter, a second band pass filter, a third band pass filter, and a fourth band pass filter. The first band pass filter passes a reception signal in the LTE band 28. The second band pass filter passes a reception signal in the LTE band 20. The third band pass filter passes a reception signal in the LTE bands 5, 19, and 26. The fourth band pass filter passes a reception signal in the LTE band 8.

The switch 41d is a single-port dual-throw switch.

The low-noise amplifier 41b receives the reception signal in the LTE band 28 from the first band pass filter of the multiplexer 41a and outputs the signal to the RFIC 101 via a terminal 4a.

The low-noise amplifier 41c receives the reception signal in the LTE band 20 from the second band pass filter of the multiplexer 41a and outputs the signal to the RFIC 101 via a terminal 4b.

When a signal in the LTE band 5, 19, or 26 is received, the switch 41d electrically connects the third band pass filter of the multiplexer 41a and the low-noise amplifier 41e to each other. The low-noise amplifier 41e receives the reception signal in the LTE band 5, 19, or 26 from the third band pass filter of the multiplexer 41a via the switch 41d, amplifies the signal, and outputs the amplified reception signal in the LTE band 5, 19, or 26 to the RFIC 101 via a terminal 4c.

When a signal in the LTE band 8 is received, the switch 41d electrically connects the fourth band pass filter of the multiplexer 41a and the low-noise amplifier 41e to each other. The low-noise amplifier 41e receives the reception signal in the LTE band 8 from the fourth band pass filter of the multiplexer 41a via the switch 41d, amplifies the signal, and outputs the amplified reception signal in the LTE band 8 to the RFIC 101 via the terminal 4c.

The LTE-medium-and-high-frequency-band-signal receiver and WiFi-2.4-GHz-band-signal transceiver circuit 42 includes a multiplexer 42a, low-noise amplifiers 42b, 42c, 42d, 42f, and 42j, switches 42e, 42g, and 42i, and a power amplifier 42h.

The multiplexer 42a is a 1-to-4 quadplexer. The multiplexer 42a electrically connects the high pass filter of the multiplexer 43 and the low-noise amplifiers 42b, 42c, and 42d to each other and electrically connects the high pass filter of the multiplexer 43 and the switch 42e to each other.

The multiplexer 42a includes a first band pass filter, a second band pass filter, a third band pass filter, and a fourth band pass filter. The first band pass filter passes a reception signal in the LTE band 3. The second band pass filter passes a reception signal in the LTE band 1. The third band pass filter passes a reception signal in the LTE band 21. The fourth band pass filter passes a reception signal in the LTE bands 7 and 41 and transmission and reception signals in the WiFi-2.4-GHz band.

The switches 42e, 42g, and 42i are single-port dual-throw switches.

The low-noise amplifier 42b receives the reception signal in the LTE band 3 from the first band pass filter of the multiplexer 42a and outputs the signal to the RFIC 101 via a terminal 4d.

The low-noise amplifier 42c receives the reception signal in the LTE band 1 from the second band pass filter of the multiplexer 42a and outputs the signal to the RFIC 101 via a terminal 4e.

When a signal in the LTE band 21 is received, the switch 42g electrically connects the low-noise amplifier 42d and a terminal 4f to each other. The low-noise amplifier 42d receives the reception signal in the LTE band 21 from the third band pass filter of the multiplexer 42a, amplifies the signal, and outputs the amplified reception signal in the LTE band 21 to the RFIC 101 via the switch 42g and the terminal 4f.

When a signal in the LTE band 7 or 41 is received, the switch 42e electrically connects the fourth band pass filter of the multiplexer 42a and the low-noise amplifier 42f to each other. The switch 42g electrically connects the low-noise amplifier 42f and the terminal 4f to each other. The low-noise amplifier 42f receives the reception signal in the LTE band 7 or 41 from the fourth band pass filter of the multiplexer 42a via the switch 42e, amplifies the signal, and outputs the amplified reception signal in the LTE band 7 or 41 to the RFIC 101 via the switch 42g and the terminal 4f.

When a signal in the WiFi-2.4-GHz band is transmitted, the switch 42i electrically connects the power amplifier 42h and the switch 42e to each other. The switch 42e electrically connects the switch 42i and the fourth band pass filter of the multiplexer 42a to each other. The power amplifier 42h receives the transmission signal in the WiFi-2.4-GHz band from the RFIC 103 via a terminal 4g, amplifies the signal, and outputs the amplified transmission signal in the WiFi-2.4-GHz band to the fourth band pass filter of the multiplexer 42a via the switches 42i and 42e.

When a signal in the WiFi-2.4-GHz band is received, the switch 42e electrically connects the fourth band pass filter of the multiplexer 42a and the switch 42i to each other. The switch 42i electrically connects the switch 42e and the low-noise amplifier 42j to each other. The low-noise amplifier 42j receives the reception signal in the WiFi-2.4-GHz band from the fourth band pass filter of the multiplexer 42a via the switches 42i and 42e, amplifies the signal, and outputs the amplified reception signal in the WiFi-2.4-GHz band to the RFIC 103 via a terminal 4h.

Figure 6:
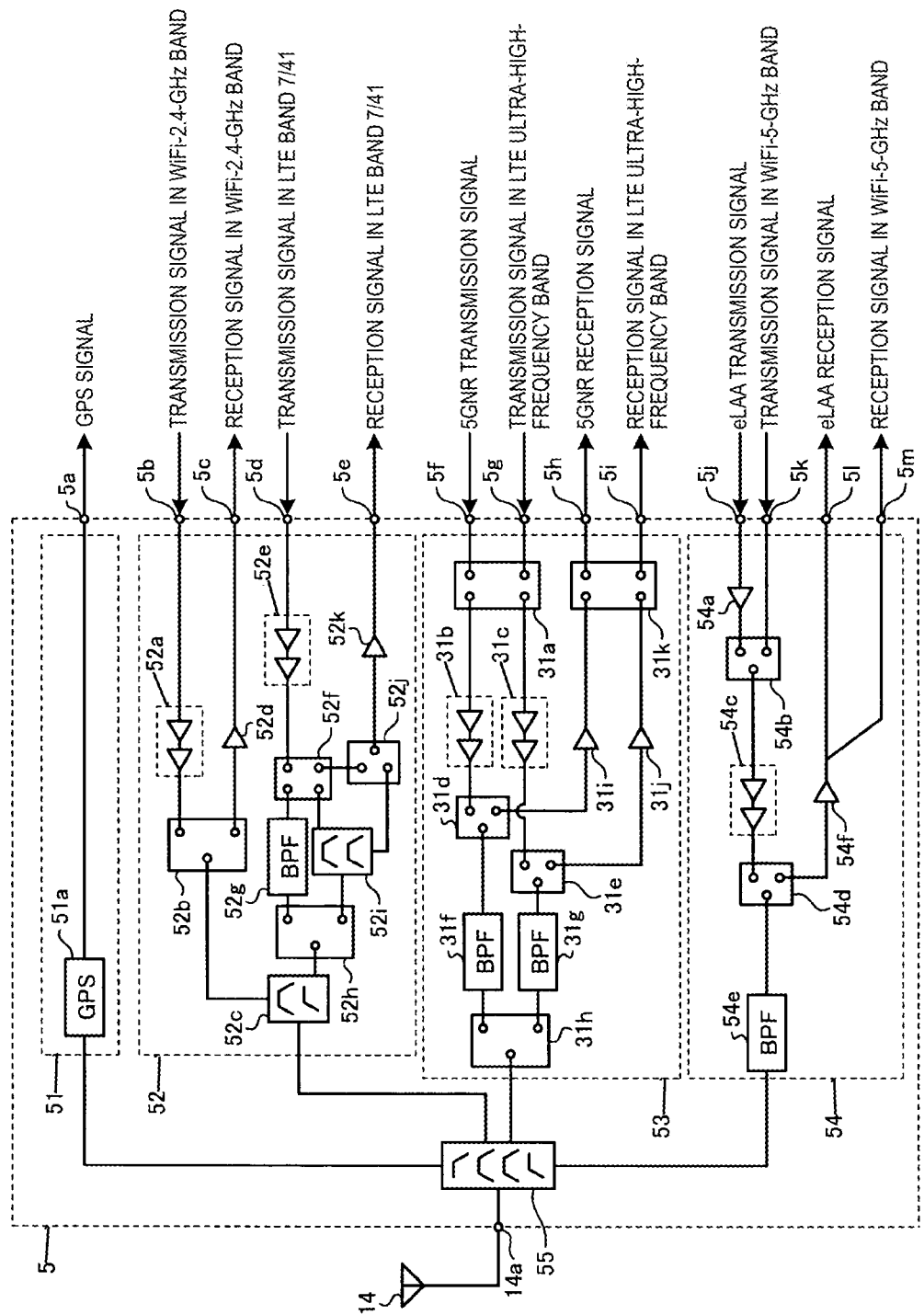
FIG. 6 illustrates the structure of a fourth circuit of the high-frequency-signal transceiver circuit according to the first embodiment.

FIG. 6 illustrates the structure of the fourth circuit of the high-frequency-signal transceiver circuit according to the first embodiment.

A set of the GPS-signal receiver circuit 51, the LTE-high-frequency-band-signal and WiFi-2.4-GHz-band-signal transceiver circuit 52, the 5GNR-signal and LTE-ultra-high-frequency-band-signal transceiver circuit 53, the eLAA-signal and WiFi-5-GHz-band-signal transceiver circuit 54, and the multiplexer 55 is a single module. The present disclosure, however, is not limited thereto. The GPS-signal receiver circuit 51, the LTE-high-frequency-band-signal and WiFi-2.4-GHz-band-signal transceiver circuit 52, the 5GNR-signal and LTE-ultra-high-frequency-band-signal transceiver circuit 53, the eLAA-signal and WiFi-5-GHz-band-signal transceiver circuit 54, and the multiplexer 55 may be different modules.

The GPS-signal receiver circuit 51 includes a GPS receiver 51a. The GPS receiver 51a receives a GPS signal from the low pass filter of the multiplexer 55 and outputs the signal to the RFIC 104 via a terminal 5a.

The LTE-high-frequency-band-signal and WiFi-2.4-GHz-band-signal transceiver circuit 52 includes power amplifiers 52a and 52e, switches 52b, 52f, 52h, and 52j, multiplexers 52c and 52i, low-noise amplifiers 52d and 52k, and a band pass filter 52g.

The multiplexer 52c is a 1-to-2 duplexer. The multiplexer 52c electrically connects the first band pass filter of the multiplexer 55 and the switches 52b and 52h to each other.

The multiplexer 52c includes a band pass filter and a high pass filter. The band pass filter passes a signal in the WiFi-2.4-GHz band. The high pass filter passes a signal in the LTE bands 7 and 41.

The multiplexer 52i is a 1-to-2 duplexer. The multiplexer 52i electrically connects the switch 52h and the switches 52f and 52j to each other.

The multiplexer 52i includes a first band pass filter and a second band pass filter. The first band pass filter passes a transmission signal in the LTE band 7. The second band pass filter passes a reception signal in the LTE band 7.

The band pass filter 52g passes a signal in the LTE band 41.

The switches 52b, 52h, and 52j are single-port dual-throw switches. The switch 52f is a dual-port dual-throw switch.

When a signal in the WiFi-2.4-GHz band is transmitted, the switch 52b electrically connects the power amplifier 52a and the band pass filter of the multiplexer 52c to each other. The power amplifier 52a receives the transmission signal in the WiFi-2.4 GHz band from the RFIC 103 via a terminal 5b, amplifies the signal, and outputs the amplified transmission signal in the WiFi-2.4 GHz band to the band pass filter of the multiplexer 52c via the switch 52b.

When a signal in the WiFi-2.4 GHz band is received, the switch 52b electrically connects the band pass filter of the multiplexer 52c and the low-noise amplifier 52d to each other. The low-noise amplifier 52d receives the reception signal in the WiFi-2.4 GHz band from the band pass filter of the multiplexer 52c via the switch 52b and outputs the signal to the RFIC 103 via a terminal 5c.

When a signal in the LTE band 7 is transmitted, the switch 52f electrically connects the power amplifier 52e and the first band pass filter of the multiplexer 52i to each other. The switch 52h electrically connects the first band pass filter of the multiplexer 52i and the high pass filter of the multiplexer 52c to each other. The power amplifier 52e receives the transmission signal in the LTE band 7 from the RFIC 101 via a terminal 5d, amplifies the signal, and outputs the amplified transmission signal in the LTE band 7 to the first band pass filter of the multiplexer 52i via the switch 52f. The first band pass filter of the multiplexer 52i passes the amplified transmission signal in the LTE band 7 and outputs the signal to the high pass filter of the multiplexer 52c via the switch 52h. The high pass filter of the multiplexer 52c passes the amplified transmission signal in the LTE band 7 and outputs the signal to the first band pass filter of the multiplexer 55.

When a signal in the LTE band 41 is transmitted, the switch 52f electrically connects the power amplifier 52e and the band pass filter 52g to each other. The switch 52h electrically connects the band pass filter 52g and the high pass filter of the multiplexer 52c to each other. The power amplifier 52e receives the transmission signal in the LTE band 41 from the RFIC 101 via the terminal 5d, amplifies the signal, and outputs the amplified transmission signal in the LTE band 41 to the band pass filter 52g via the switch 52f. The band pass filter 52g passes the amplified transmission signal in the LTE band 41 and outputs the signal to the high pass filter of the multiplexer 52c via the switch 52h. The high pass filter of the multiplexer 52c passes the amplified transmission signal in the LTE band 41 and outputs the signal to the first band pass filter of the multiplexer 55.

When a signal in the LTE band 7 is received, the switch 52h electrically connects the high pass filter of the multiplexer 52c and the second band pass filter of the multiplexer 52i to each other. The switch 52j electrically connects the second band pass filter of the multiplexer 52i and the low-noise amplifier 52k to each other. The low-noise amplifier 52k receives the reception signal in the LTE band 7 from the second band pass filter of the multiplexer 52i via the switch 52j, amplifies the signal, and outputs the amplified reception signal in the LTE band 7 to the RFIC 101 via a terminal 5e.

When a signal in the LTE band 41 is received, the switch 52h electrically connects the high pass filter of the multiplexer 52c and the band pass filter 52g to each other. The switch 52f electrically connects the band pass filter 52g and the switch 52j to each other. The switch 52j electrically connects the switch 52f and the low-noise amplifier 52k to each other. The low-noise amplifier 52k receives the reception signal in the LTE band 41 from the band pass filter 52g via the switches 52f and 52j, amplifies the signal, and outputs the amplified reception signal in the LTE band 41 to the RFIC 101 via the terminal 5e.

The circuit components of the 5GNR-signal and LTE-ultra-high-frequency-band-signal transceiver circuit 53 are the same as the circuit components of the 5GNR-signal and LTE-ultra-high-frequency-band-signal transceiver circuit 31 (see FIG. 4) and are designated by like reference numbers, and a description thereof is omitted.

The 5GNR-signal and LTE-ultra-high-frequency-band-signal transceiver circuit 53 receives a 4.5 to 4.99 GHz 5GNR transmission signal from the RFIC 102 via a terminal 5f, amplifies the signal, and outputs the amplified 4.5 to 4.99 GHz 5GNR transmission signal to the second band pass filter of the multiplexer 55.

The 5GNR-signal and LTE-ultra-high-frequency-band-signal transceiver circuit 53 receives a transmission signal in the LTE ultra-high-frequency band from the RFIC 101 via a terminal 5g, amplifies the signal, and outputs the amplified transmission signal in the LTE ultra-high-frequency band to the second band pass filter of the multiplexer 55.

The 5GNR-signal and LTE-ultra-high-frequency-band-signal transceiver circuit 53 receives a 4.5 to 4.99 GHz 5GNR reception signal from the second band pass filter of the multiplexer 55, amplifies the signal, and outputs the amplified 4.5 to 4.99 GHz 5GNR reception signal to the RFIC 102 via a terminal 5h.

The 5GNR-signal and LTE-ultra-high-frequency-band-signal transceiver circuit 53 receives a reception signal in the LTE ultra-high-frequency band from the second band pass filter of the multiplexer 55, amplifies the signal, and outputs the amplified reception signal in the LTE ultra-high-frequency band to the RFIC 101 via a terminal 5i.

The eLAA-signal and WiFi-5-GHz-band-signal transceiver circuit 54 includes power amplifiers 54a and 54c, switches 54b and 54d, a band pass filter 54e, and a low-noise amplifier 54f.

The band pass filter 54e passes an eLAA signal and a signal of in the WiFi-5-GHz band.

The switches 54b and 54d are single-port dual-throw switches.

When an eLAA signal is transmitted, the switch 54b electrically connects the power amplifier 54a and the power amplifier 54c to each other. The switch 54d electrically connects the power amplifier 54c and the band pass filter 54e to each other. The power amplifier 54a receives the eLAA transmission signal from the RFIC 101 via a terminal 5j, amplifies the signal, and outputs the amplified eLAA transmission signal to the power amplifier 54c via the switch 54b. The power amplifier 54c receives the eLAA transmission signal amplified by the power amplifier 54a from the power amplifier 54a via the switch 54b, further amplifies the signal, and outputs the amplified eLAA transmission signal to the band pass filter 54e via the switch 54d. The band pass filter 54e passes the eLAA transmission signal amplified by the power amplifier 54c and outputs the signal to the high pass filter of the multiplexer 55.

When a signal in the WiFi-5-GHz band is transmitted, the switch 54b electrically connects a terminal 5k and the power amplifier 54c to each other. The switch 54d electrically connects the power amplifier 54c and the band pass filter 54e to each other. The power amplifier 54c receives the transmission signal in the WiFi-5-GHz band from the RFIC 103 via the terminal 5k and the switch 54b, amplifies the signal, and outputs the amplified transmission signal in the WiFi-5-GHz band to the band pass filter 54e via the switch 54d. The band pass filter 54e passes the transmission signal in the WiFi-5-GHz band amplified by the power amplifier 54c and outputs the signal to the high pass filter of the multiplexer 55.

When an eLAA signal is received, or a signal in the WiFi-5-GHz band is received, the switch 54d electrically connects the band pass filter 54e and the low-noise amplifier 54f to each other. The band pass filter 54e receives the eLAA reception signal or the reception signal in the WiFi-5-GHz band from the high pass filter of the multiplexer 55, passes the signal, and outputs the signal to the low-noise amplifier 54f via the switch 54d. The low-noise amplifier 54f amplifies the eLAA reception signal or the reception signal in the WiFi-5-GHz band and outputs the amplified eLAA reception signal to the RFIC 101 via a terminal 5l. The low-noise amplifier 54f amplifies the reception signal in the WiFi-5-GHz band and outputs the amplified reception signal in the WiFi-5-GHz band to the RFIC 103 via a terminal 5m.

The LTE-high-frequency-band-signal and WiFi-2.4-GHz-band-signal transceiver circuit 52 and the 5GNR-signal and LTE-ultra-high-frequency-band-signal transceiver circuit 53 are preferably isolated from each other. Examples of the isolation include an increase in the physical distance between the circuits and isolation with a metal shield. The reason is that the frequency of the second harmonic of a signal in the LTE band 7 or 41 or the WiFi-2.4 GHz band is close to the frequency of a 5GNR signal or a signal in the LTE ultra-high-frequency band, and accordingly, there is a possibility that the 5GNR-signal and LTE-ultra-high-frequency-band-signal transceiver circuit 53 is affected by the second harmonic of the signal in the LTE band 7 or 41 or the WiFi-2.4 GHz band.

The 5GNR-signal and LTE-ultra-high-frequency-band-signal transceiver circuit 53 and the eLAA-signal and WiFi-5-GHz-band-signal transceiver circuit 54 are preferably isolated from each other. The reason is that the frequency of a 5GNR signal or a signal in the LTE ultra-high-frequency band is close to the frequency of an eLAA signal or a signal in the WiFi-5-GHz band, and accordingly, there is a possibility that the 5GNR-signal and LTE-ultra-high-frequencyband-signal transceiver circuit 53 and the eLAA-signal and WiFi-5-GHz-band-signal transceiver circuit 54 are affected by each other. In the case of conducting the time-division transmission and reception of a 5GNR signal or a signal in the LTE ultra-high-frequency band and time-division transmission and reception of an eLAA signal or a signal in the WiFi-5-GHz band, isolation is not necessary.

Figure 7:
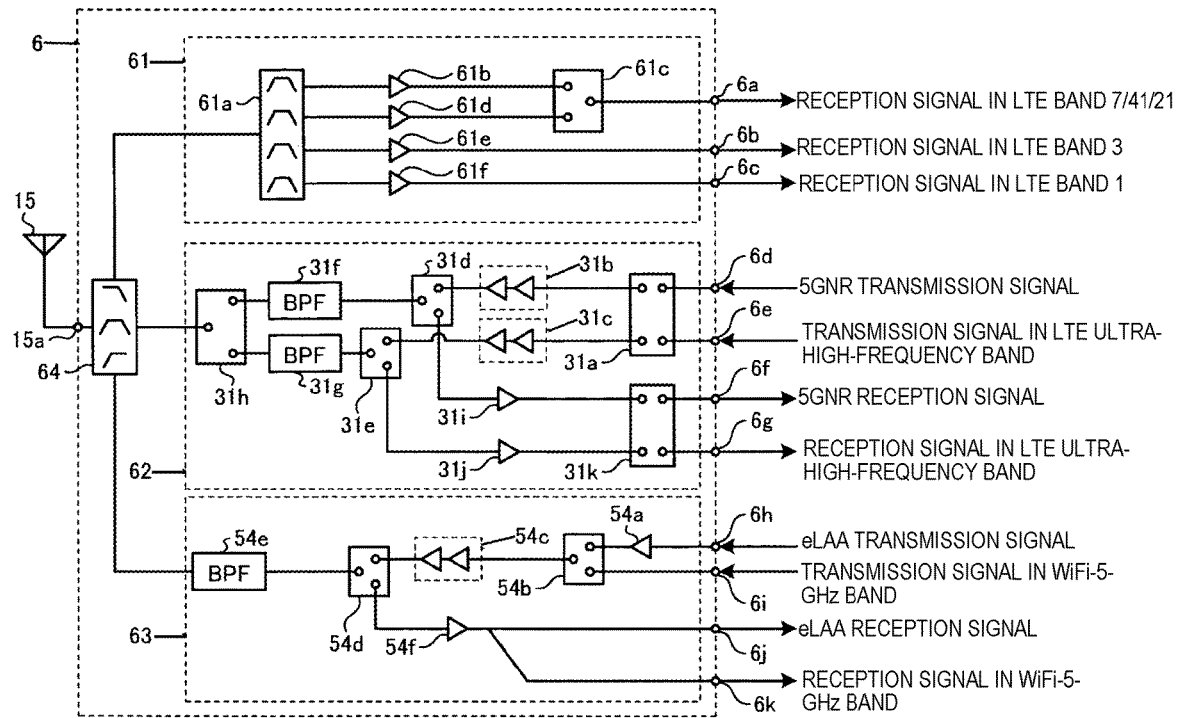
FIG. 7 illustrates the structure of a fifth circuit of the high-frequency-signal transceiver circuit according to the first embodiment.

FIG. 7 illustrates the structure of the fifth circuit of the high-frequency-signal transceiver circuit according to the first embodiment.

A set of the LTE-medium-and-high-frequency-band-signal receiver circuit 61, the 5GNR-signal and LTE-ultra-high-frequency-band-signal transceiver circuit 62, the eLAA-signal and WiFi-5-GHz-band-signal transceiver circuit 63, and the multiplexer 64 is a single module. The present disclosure, however, is not limited thereto. The LTE-medium-and-high-frequency-band-signal receiver circuit 61, the 5GNR-signal and LTE-ultra-high-frequency-band-signal transceiver circuit 62, the eLAA-signal and WiFi-5-GHz-band-signal transceiver circuit 63, and the multiplexer 64 may be different modules.

The LTE-medium-and-high-frequency-band-signal receiver circuit 61 includes a multiplexer 61a, low-noise amplifiers 61b, 61d, 61e, and 61f, and a switch 61c.

The multiplexer 61a is a 1-to-4 quadplexer. The multiplexer 61a electrically connects the low pass filter of the multiplexer 64 and the low-noise amplifiers 61b, 61d, 61e, and 61f to each other.

The multiplexer 61a includes a first band pass filter, a second band pass filter, a third band pass filter, and a fourth band pass filter. The first band pass filter passes a reception signal in the LTE bands 7 and 41. The second band pass filter passes a reception signal in the LTE band 21. The third band pass filter passes a reception signal in the LTE band 3. The fourth band pass filter passes a reception signal in the LTE band 1.

The switch 61c is a single-port dual-throw switch.

When a signal in the LTE band 7 or 41 is received, the switch 61c electrically connects the low-noise amplifier 61b and a terminal 6a to each other. The low-noise amplifier 61b receives the reception signal in the LTE band 7 or 41 from the first band pass filter of the multiplexer 61a, amplifies the signal, and outputs the amplified reception signal in the LTE band 7 or 41 to the RFIC 101 via the terminal 6a.

When a signal in the LTE band 21 is received, the switch 61c electrically connects the low-noise amplifier 61d and the terminal 6a to each other. The low-noise amplifier 61d receives the reception signal in the LTE band 21 from the second band pass filter of the multiplexer 61a, amplifies the signal, and outputs the amplified reception signal in the LTE band 21 to the RFIC 101 via the terminal 6a.

The low-noise amplifier 61e receives a reception signal in the LTE band 3 from the third band pass filter of the multiplexer 61a, amplifies the signal, and outputs the amplified reception signal in the LTE band 3 to the RFIC 101 via a terminal 6b.

The low-noise amplifier 61f receives a reception signal in the LTE band 1 from the fourth band pass filter of the multiplexer 61a, amplifies the signal, and outputs the amplified reception signal in the LTE band 1 to the RFIC 101 via a terminal 6c.

The circuit components of the 5GNR-signal and LTE-ultra-high-frequency-band-signal transceiver circuit 62 are the same as the circuit components of the 5GNR-signal and LTE-ultra-high-frequency-band-signal transceiver circuit 31 (see FIG. 4) and are designated by like reference numbers, and a description thereof is omitted.

The 5GNR-signal and LTE-ultra-high-frequency-band-signal transceiver circuit 62 receives a 4.5 to 4.99 GHz 5GNR transmission signal from the RFIC 102 via a terminal 6d, amplifies the signal, and outputs the amplified 4.5 to 4.99 GHz 5GNR transmission signal to the band pass filter of the multiplexer 64.

The 5GNR-signal and LTE-ultra-high-frequency-band-signal transceiver circuit 62 receives a transmission signal in the LTE ultra-high-frequency band from the RFIC 101 via a terminal 6e, amplifies the signal, and outputs the amplified transmission signal in the LTE ultra-high-frequency band to the band pass filter of the multiplexer 64.

The 5GNR-signal and LTE-ultra-high-frequency-band-signal transceiver circuit 62 receives a 4.5 to 4.99 GHz 5GNR reception signal from the band pass filter of the multiplexer 64, amplifies the signal, and outputs the amplified 4.5 to 4.99 GHz 5GNR reception signal to the RFIC 102 via a terminal 6f.

The 5GNR-signal and LTE-ultra-high-frequency-band-signal transceiver circuit 62 receives a reception signal in the LTE ultra-high-frequency band from the band pass filter of the multiplexer 64, amplifies the signal, and outputs the amplified reception signal in the LTE ultra-high-frequency band to the RFIC 101 via a terminal 6g.

The circuit components of the eLAA-signal and WiFi-5-GHz-band-signal transceiver circuit 63 are the same as the circuit components of the eLAA-signal and WiFi-5-GHz-band-signal transceiver circuit 54 (see FIG. 6) and are designated by like reference numbers, and a description thereof is omitted.

The eLAA-signal and WiFi-5-GHz-band-signal transceiver circuit 63 receives an eLAA transmission signal from the RFIC 101 via a terminal 6h, amplifies the signal, and outputs the amplified eLAA transmission signal to the high pass filter of the multiplexer 64.

The eLAA-signal and WiFi-5-GHz-band-signal transceiver circuit 63 receives a transmission signal in the WiFi-5-GHz band from the RFIC 103 via a terminal 6i, amplifies the signal, and outputs the amplified transmission signal in the WiFi-5-GHz band to the high pass filter of the multiplexer 64.

The eLAA-signal and WiFi-5-GHz-band-signal transceiver circuit 63 receives an eLAA reception signal from the high pass filter of the multiplexer 64, amplifies the signal, and outputs the amplified eLAA reception signal to the RFIC 101 via a terminal 6j.

The eLAA-signal and WiFi-5-GHz-band-signal transceiver circuit 63 receives a reception signal in the WiFi-5-GHz band from the high pass filter of the multiplexer 64, amplifies the signal, and outputs the amplified reception signal in the WiFi-5-GHz band to the RFIC 103 via a terminal 6k.

The LTE-medium-and-high-frequency-band-signal receiver circuit 61 and the 5GNR-signal and LTE-ultra-high-frequency-band-signal transceiver circuit 62 are preferably isolated from each other. The reason is that the frequency of the second harmonic of a signal in the LTE band 7, 41, or 21 is close to the frequency of a 5GNR signal or a signal in the LTE ultra-high-frequency band, and accordingly, there is a possibility that the 5GNR-signal and LTE-ultra-high-frequency-band-signal transceiver circuit 62 is affected by the second harmonic of the signal in the LTE band 7, 41, or 21.

The 5GNR-signal and LTE-ultra-high-frequency-band-signal transceiver circuit 62 and the eLAA-signal and WiFi-5-GHz-band-signal transceiver circuit 63 are preferably isolated from each other. The reason is that the frequency of a 5GNR signal or a signal in the LTE ultra-high-frequency band is close to the frequency of an eLAA signal or a signal in the WiFi-5-GHz band, and accordingly, there is a possibility that the 5GNR-signal and LTE-ultra-high-frequency-band-signal transceiver circuit 62 and the eLAA-signal and WiFi-5-GHz-band-signal transceiver circuit 63 are affected by each other. In the case of conducting the time-division transmission and reception of a 5GNR signal or a signal in the LTE ultra-high-frequency band and time-division transmission and reception of an eLAA signal or a signal in the WiFi-5-GHz band, isolation is not necessary.

The GPS-signal receiver circuit 51 (see FIG. 6) may not be included in the fourth circuit 5, but may be included in the fifth circuit 6. In this case, the multiplexer 55 (see FIG. 6) of the fourth circuit 5 is a 1-to-3 triplexer, and the multiplexer 64 of the fifth circuit 6 is a 1-to-4 quadplexer.

Figure 8:
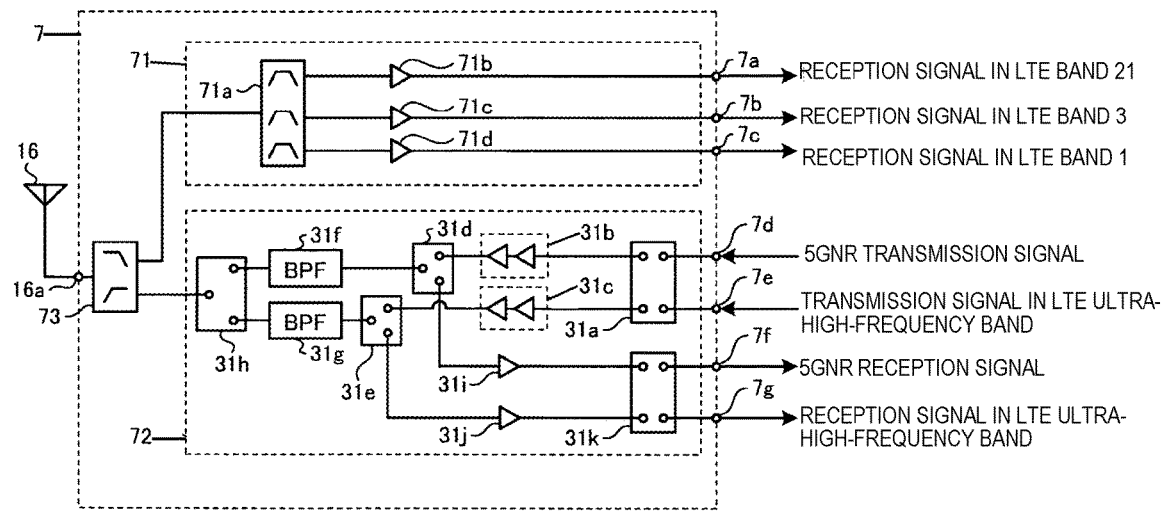
FIG. 8 illustrates the structure of a sixth circuit of the high-frequency-signal transceiver circuit according to the first embodiment.

FIG. 8 illustrates the structure of the sixth circuit of the high-frequency-signal transceiver circuit according to the embodiment.

A set of the LTE-medium-frequency-band-signal receiver circuit 71, the 5GNR-signal and LTE-ultra-high-frequency-band-signal transceiver circuit 72, and the multiplexer 73 is a single module. The present disclosure, however, is not limited thereto. The LTE-medium-frequency-band-signal receiver circuit 71, the 5GNR-signal and LTE-ultra-high-frequency-band-signal transceiver circuit 72, and the multiplexer 73 may be different modules.

The LTE-medium-frequency-band-signal receiver circuit 71 includes a multiplexer 71*a*, and low-noise amplifiers 71*b*, 71*c*, and 71*d*.

The multiplexer 71*a* is a 1-to-3 triplexer. The multiplexer 71*a* electrically connects the low pass filter of the multiplexer 73 and the low-noise amplifiers 71*b*, 71*c*, and 71*d* to each other.

The multiplexer 71*a* includes a first band pass filter, a second band pass filter, and a third band pass filter. The first band pass filter passes a reception signal in the LTE band 21. The second band pass filter passes a reception signal in the LTE band 3. The third band pass filter passes a reception signal in the LTE band 1.

The low-noise amplifier 71*b* receives the reception signal in the LTE band 21 from the first band pass filter of the multiplexer 71*a* and outputs the signal to the RFIC 101 via a terminal 7*a*.

The low-noise amplifier 71*c* receives the reception signal in the LTE band 3 from the second band pass filter of the multiplexer 71*a* and outputs the signal to the RFIC 101 via a terminal 7*b*.

The low-noise amplifier 71*d* receives the reception signal in the LTE band 1 from the third band pass filter of the multiplexer 71*a* and outputs the signal to the RFIC 101 via a terminal 7*c*.

The circuit components of the 5GNR-signal and LTE-ultra-high-frequency-band-signal transceiver circuit 72 are the same as the circuit components of the 5GNR-signal and LTE-ultra-high-frequency-band-signal transceiver circuit 31 (see FIG. 4) and are designated by like reference numbers, and a description thereof is omitted.

The 5GNR-signal and LTE-ultra-high-frequency-band-signal transceiver circuit 72 receives a 4.5 to 4.99 GHz 5GNR transmission signal from the RFIC 102 via a terminal 7*d*, amplifies the signal, and outputs the amplified 4.5 to 4.99 GHz 5GNR transmission signal to the high pass filter of the multiplexer 73.

The 5GNR-signal and LTE-ultra-high-frequency-band-signal transceiver circuit 72 receives a transmission signal in the LTE ultra-high-frequency band from the RFIC 101 via a terminal 7*e*, amplifies the signal, and outputs the amplified transmission signal in the LTE ultra-high-frequency band to the high pass filter of the multiplexer 73.

The 5GNR-signal and LTE-ultra-high-frequency-band-signal transceiver circuit 72 receives a 4.5 to 4.99 GHz 5GNR reception signal from the high pass filter of the multiplexer 73, amplifies the signal, and outputs the amplified 4.5 to 4.99 GHz 5GNR reception signal to the RFIC 102 via a terminal 7*f*.

The 5GNR-signal and LTE-ultra-high-frequency-band-signal transceiver circuit 72 receives a reception signal in the LTE ultra-high-frequency band from the high pass filter of the multiplexer 73, amplifies the signal, and outputs the amplified reception signal in the LTE ultra-high-frequency band to the RFIC 101 via a terminal 7*g*.

The LTE-medium-frequency-band-signal receiver circuit 71 and the 5GNR-signal and LTE-ultra-high-frequency-band-signal transceiver circuit 72 are preferably isolated from each other. The reason is that the frequency of the second harmonic of a signal in the LTE band 21, 3, or 1 is close to the frequency of a 5GNR signal or a signal in the LTE ultra-high-frequency band, and accordingly, there is a possibility that the 5GNR-signal and LTE-ultra-high-frequency-band-signal transceiver circuit 72 is affected by the second harmonic of the signal in the LTE band 21, 3, or 1.

The second circuit 3, the fourth circuit 5, the fifth circuit 6, and the sixth circuit 7 can transmit and receive a 5GNR signal and a signal in the LTE ultra-high-frequency band as described above. That is, the high-frequency-signal transceiver circuit 1 achieves 4×4 MIMO communication (multiple-input and multiple-output communication) in the 5GNR and LTE ultra-high-frequency bands. Consequently, the high-frequency-signal transceiver circuit 1 can improve the quality and speed of communication in the 5GNR and LTE ultra-high-frequency bands.

In the 5GNR-signal and LTE-ultra-high-frequency-band-signal transceiver circuits 31, 53, 62, and 72, the power amplifier 31*c* is used to amplify a 5GNR transmission signal in the 3.5 GHz band and a transmission signal in the LTE ultra-high-frequency band. In addition, the low-noise amplifier 31*j* is used to amplify a 5GNR reception signal in the 3.5 GHz band and a reception signal in the LTE ultra-high-frequency band. Consequently, the high-frequency-signal transceiver circuit 1 enables the size and cost of the circuit to be decreased.

The high-frequency-signal transceiver circuit 1 enables the number of circuit components that are added to an existing LTE front-end circuit to be decreased. Consequently, the high-frequency-signal transceiver circuit 1 enables the size and cost of the circuit to be decreased.

The high-frequency-signal transceiver circuit 1 achieves LTE, WiFi, 5GNR, and LTE-ultra-high-frequency-band communication with the six antennas of the first antenna 11 to the sixth antenna 16, the number of which is small. Consequently, the high-frequency-signal transceiver circuit 1 enables the size and cost of the mobile communication device to be decreased.

The second circuit 3 is directly connected to the second antenna terminal 12*a*, and no multiplexer is interposed therebetween. Accordingly, the second circuit 3 enables the attenuation of a 5GNR signal and a signal in the LTE ultra-high-frequency band to be reduced. Consequently, the high-frequency-signal transceiver circuit 1 can improve the quality of communication in the 5GNR and LTE ultra-high-frequency bands.

First Modification

Figure 9:
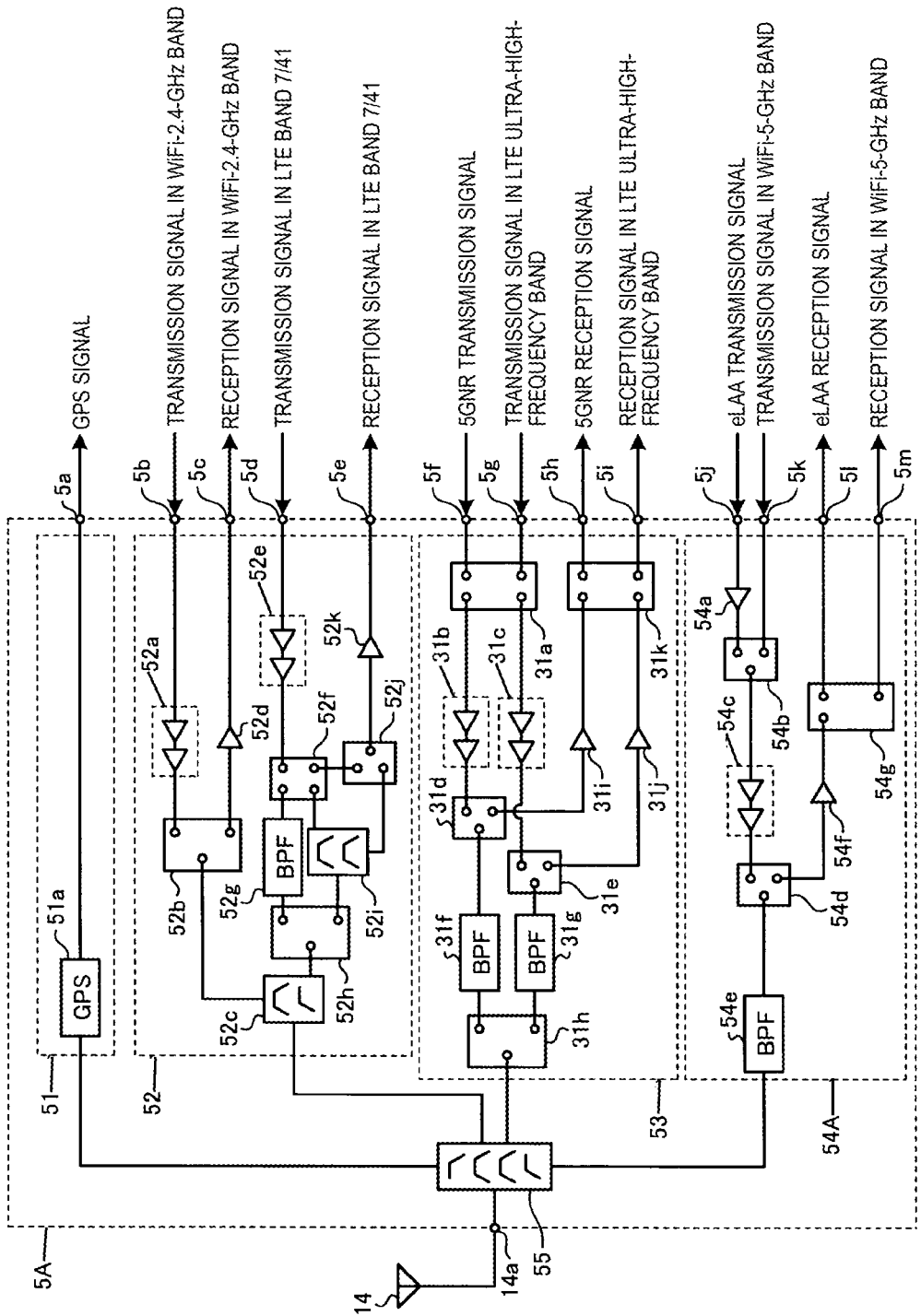
FIG. 9 illustrates the structure of a fourth circuit of a high-frequency-signal transceiver circuit according to a first modification to the first embodiment.
Figure 10:
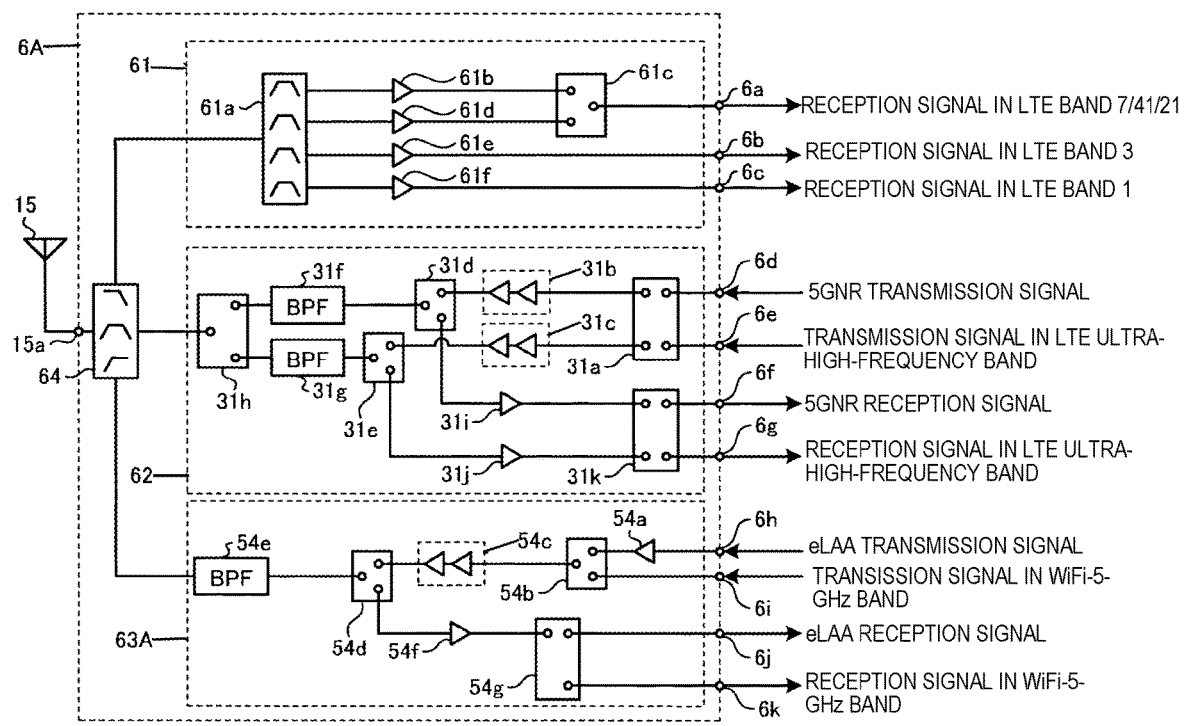
FIG. 10 illustrates the structure of a fifth circuit of the high-frequency-signal transceiver circuit according to the first modification to the first embodiment.

FIG. 9 illustrates the structure of a fourth circuit of a high-frequency-signal transceiver circuit according to a first modification to the first embodiment. FIG. 10 illustrates the structure of a fifth circuit of the high-frequency-signal transceiver circuit according to the first modification to the first embodiment. A first circuit to a third circuit and a sixth circuit of the high-frequency-signal transceiver circuit according to the first modification are the same as the first circuit 2 to the third circuit 4 and the sixth circuit 7 of the high-frequency-signal transceiver circuit 1 according to the embodiment, and an illustration and description thereof are omitted.

Referring to FIG. 9, a fourth circuit 5A includes an eLAA-signal and WiFi-5-GHz-band-signal transceiver circuit 54A instead of the eLAA-signal and WiFi-5-GHz-band-signal transceiver circuit 54 (see FIG. 6). The eLAA-signal and WiFi-5-GHz-band-signal transceiver circuit 54A further includes a switch 54g unlike the eLAA-signal and WiFi-5-GHz-band-signal transceiver circuit 54.

The switch 54g is a single-port dual-throw switch.

When an eLAA signal is received, the switch 54d electrically connects the band pass filter 54e and the low-noise amplifier 54f to each other. The switch 54g electrically connects the low-noise amplifier 54f and the terminal 5l to each other. The band pass filter 54e receives the eLAA reception signal from the high pass filter of the multiplexer 55, passes the signal, and outputs the signal to the low-noise amplifier 54f via the switch 54d. The low-noise amplifier 54f amplifies the eLAA reception signal and outputs the amplified eLAA reception signal to the RFIC 101 via the switch 54g and the terminal 5l.

When a signal in the WiFi-5-GHz band is received, the switch 54d electrically connects the band pass filter 54e and the low-noise amplifier 54f to each other. The switch 54g electrically connects the low-noise amplifier 54f and the terminal 5m to each other. The band pass filter 54e receives the reception signal in the WiFi-5-GHz band from the high pass filter of the multiplexer 55, passes the signal, and outputs the signal to the low-noise amplifier 54f via the switch 54d. The low-noise amplifier 54f amplifies the reception signal in the WiFi-5-GHz band and outputs the amplified reception signal in the WiFi-5-GHz band to the RFIC 103 via the terminal 5m.

Referring to FIG. 10, a fifth circuit 6A includes an eLAA-signal and WiFi-5-GHz-band-signal transceiver circuit 63A instead of the eLAA-signal and WiFi-5-GHz-band-signal transceiver circuit 63 (see FIG. 7). The eLAA-signal and WiFi-5-GHz-band-signal transceiver circuit 63A further includes the switch 54g unlike the eLAA-signal and WiFi-5-GHz-band-signal transceiver circuit 63.

The operation of the eLAA-signal and WiFi-5-GHz-band-signal transceiver circuit 63A is the same as the operation of the eLAA-signal and WiFi-5-GHz-band-signal transceiver circuit 54A, and a description thereof is omitted.

In the eLAA-signal and WiFi-5-GHz-band-signal transceiver circuit 54 according to the first embodiment, an eLAA reception signal and a reception signal in the WiFi-5-GHz band are outputted from the terminals 5l and 5m. Accordingly, in the case where both of the eLAA signal and the signal in the WiFi-5-GHz band are received, it is necessary for the RFICs 101 and 103 to isolate the eLAA reception signal and the reception signal in the WiFi-5-GHz band from each other.

In the eLAA-signal and WiFi-5-GHz-band-signal transceiver circuit 54A according to the first modification, the switch 54g can isolate the eLAA reception signal and the reception signal in the WiFi-5-GHz band from each other. Accordingly, only the eLAA reception signal is outputted from the terminal 5l, and only the reception signal in the WiFi-5-GHz band is outputted from the terminal 5m. Consequently, the eLAA-signal and WiFi-5-GHz-band-signal transceiver circuit 54A can eliminate the need for the RFICs 101 and 103 to isolate the eLAA reception signal and the reception signal in the WiFi-5-GHz band from each other.

Second Modification

Figure 11:
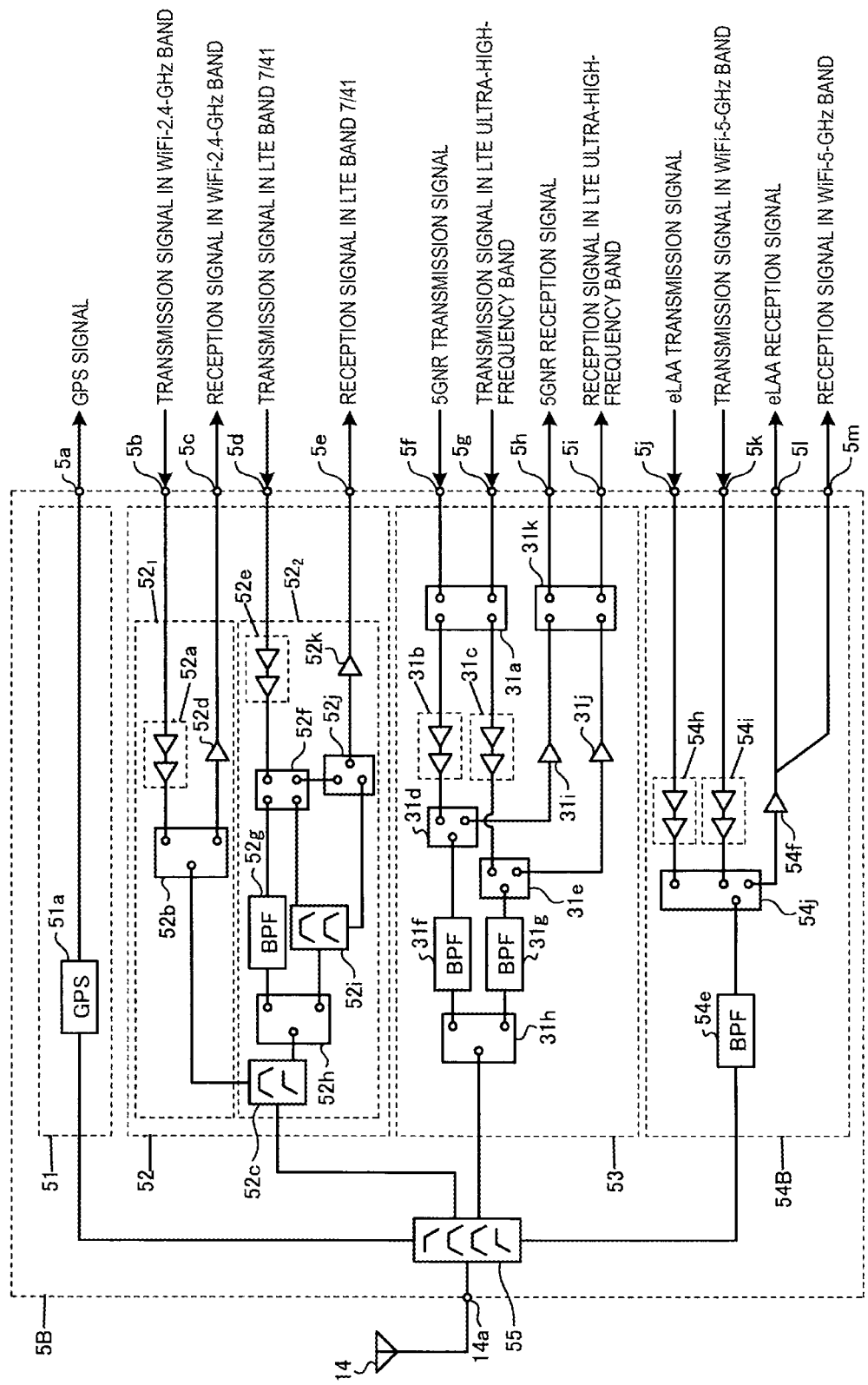
FIG. 11 illustrates the structure of a fourth circuit of a high-frequency-signal transceiver circuit according to a second modification to the first embodiment.

FIG. 11 illustrates the structure of a fourth circuit of a high-frequency-signal transceiver circuit according to a second modification to the first embodiment. A first circuit to a third circuit and a fifth circuit to a sixth circuit of the high-frequency-signal transceiver circuit according to the second modification are the same as the first circuit 2 to the third circuit 4 and the fifth circuit 6 to the sixth circuit 7 of the high-frequency-signal transceiver circuit 1 according to the embodiment, and an illustration and description thereof are omitted.

Referring to FIG. 11, the LTE-high-frequency-band-signal and WiFi-2.4-GHz-band-signal transceiver circuit 52 is divided into a WiFi-2.4-GHz-band-signal transceiver circuit $52_1$ and a LTE-high-frequency-band-signal transceiver circuit $52_2$.

The WiFi-2.4-GHz-band-signal transceiver circuit $52_1$ includes the power amplifier 52a, the switch 52b, and the low-noise amplifier 52d. The LTE-high-frequency-band-signal transceiver circuit $52_2$ includes the multiplexer 52c, the power amplifier 52e, the switch 52f, the band pass filter 52g, the switch 52h, the multiplexer 52i, the switch 52j, and the low-noise amplifier 52k.

A set of the WiFi-2.4-GHz-band-signal transceiver circuit $52_1$ and the LTE-high-frequency-band-signal transceiver circuit $52_2$ is a single module. The present disclosure, however, is not limited thereto. The WiFi-2.4-GHz-band-signal transceiver circuit $52_1$ and LTE-high-frequency-band-signal transceiver circuit $52_2$ may be different modules.

A fourth circuit 5B includes an eLAA-signal and WiFi-5-GHz-band-signal transceiver circuit 54B instead of the eLAA-signal and WiFi-5-GHz-band-signal transceiver circuit 54 (see FIG. 6).

The eLAA-signal and WiFi-5-GHz-band-signal transceiver circuit 54B may be a module.

The eLAA-signal and WiFi-5-GHz-band-signal transceiver circuit 54B includes a power amplifier 54h, a power amplifier 54i, and a switch 54j instead of the power amplifier 54a, the switch 54b, the power amplifier 54c, and the switch 54d unlike the eLAA-signal and WiFi-5-GHz-band-signal transceiver circuit 54.

The switch 54j is a single-port triple-throw switch.

When an eLAA signal is transmitted, the switch 54j electrically connects the power amplifier 54h and the band pass filter 54e to each other. The power amplifier 54h receives the eLAA transmission signal from the RFIC 101 via the terminal 5j, amplifies the signal, and outputs the amplified eLAA transmission signal to the band pass filter 54e via the switch 54j. The band pass filter 54e passes the eLAA transmission signal amplified by the power amplifier 54h and outputs the signal to the high pass filter of the multiplexer 55.

When a signal in the WiFi-5-GHz band is transmitted, the switch 54j electrically connects the power amplifier 54i and the band pass filter 54e to each other. The power amplifier 54i receives the transmission signal in the WiFi-5-GHz band from the RFIC 103 via the terminal 5k, amplifies the signal, and outputs the amplified transmission signal in the WiFi-5-GHz band to the band pass filter 54e via the switch 54j. The band pass filter 54e passes the transmission signal in the WiFi-5-GHz band amplified by the power amplifier 54i and outputs the signal to the high pass filter of the multiplexer 55.

When an eLAA signal is received or a signal in the WiFi-5-GHz band is received, the switch 54j electrically connects the band pass filter 54e and the low-noise amplifier 54f to each other. The band pass filter 54e receives the eLAA reception signal or the reception signal in the WiFi-5-GHz band from the high pass filter of the multiplexer 55, passes the signal, and outputs the signal to the low-noise amplifier 54f via the switch 54j. The low-noise amplifier 54f amplifies the eLAA reception signal and outputs the amplified eLAA reception signal to the RFIC 101 via the terminal 5l. The low-noise amplifier 54f amplifies the reception signal in the WiFi-5-GHz band and outputs the amplified reception signal in the WiFi-5-GHz band to the RFIC 103 via the terminal 5m.

In the fourth circuit 5 according to the first embodiment, the power amplifier 54c is used to amplify the eLAA transmission signal and the transmission signal in the WiFi-5-GHz band. Accordingly, there is a possibility that the fourth circuit 5 is not suitable to amplify the eLAA transmission signal and the transmission signal in the WiFi-5-GHz band.

In the fourth circuit 5B according to the second modification, the power amplifier 54h amplifies the eLAA transmission signal, and the power amplifier 54i amplifies the transmission signal in the WiFi-5-GHz band. Accordingly, the fourth circuit 5B is suitable to amplify the eLAA transmission signal and the transmission signal in the WiFi-5-GHz band.

The circuit structure of the eLAA-signal and WiFi-5-GHz-band-signal transceiver circuit 63 of the fifth circuit 6 may be the same as the circuit structure of the eLAA-signal and WiFi-5-GHz-band-signal transceiver circuit 54B of the fourth circuit 5B.

The first modification and the second modification may be combined. That is, the eLAA-signal and WiFi-5-GHz-band-signal transceiver circuit 54B of the fourth circuit 5B according to the second modification may include the switch 54g of the eLAA-signal and WiFi-5-GHz-band-signal transceiver circuit 54A of the fourth circuit 5A (see FIG. 9) according to the first modification.

The fourth circuit 5B according to the second modification may not include the GPS-signal receiver circuit 51, and the fifth circuit 6 may include the GPS-signal receiver circuit 51.

Third Modification

Figure 12:
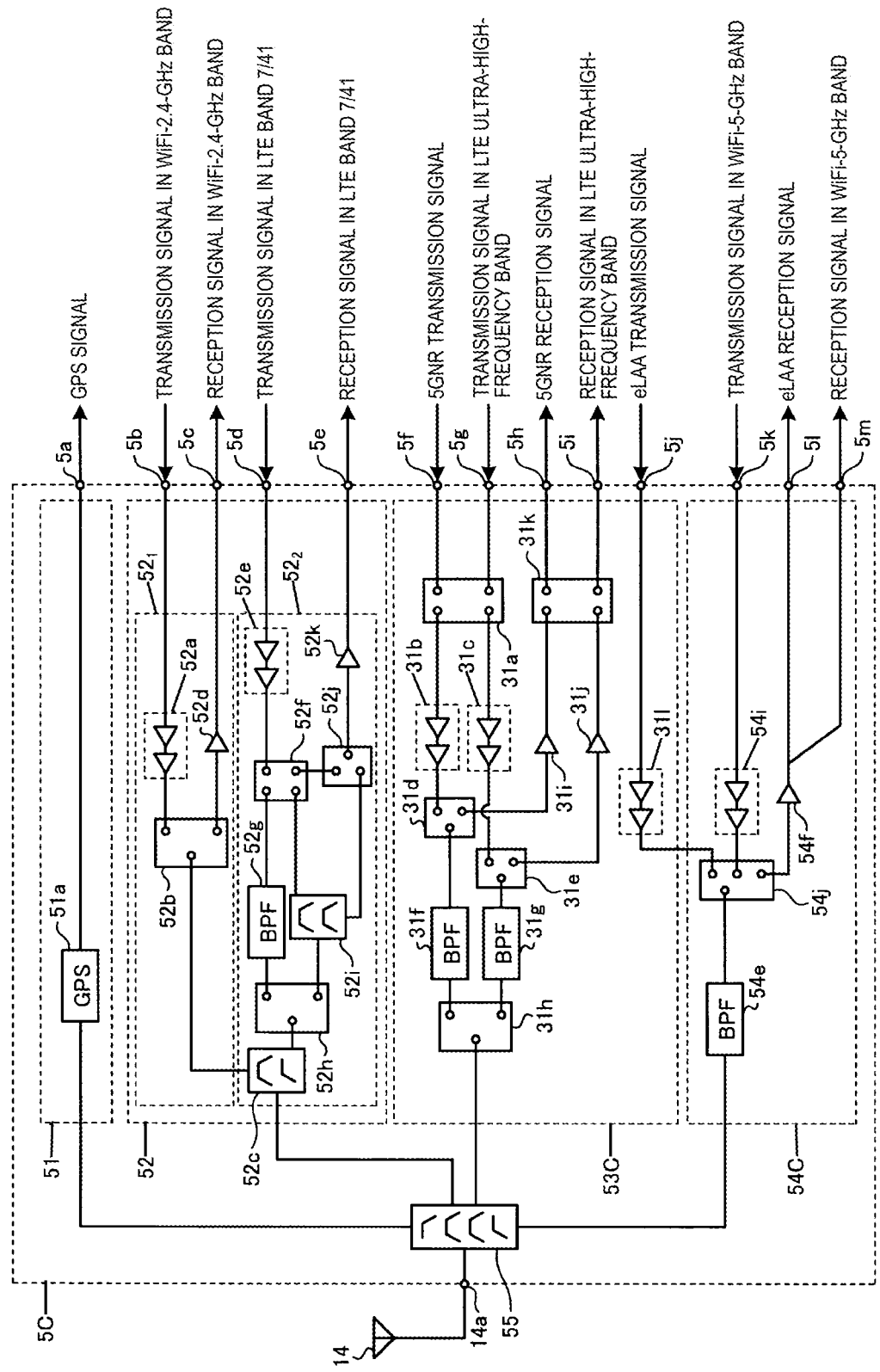
FIG. 12 illustrates the structure of a fourth circuit of a high-frequency-signal transceiver circuit according to a third modification to the first embodiment.

FIG. 12 illustrates the structure of a fourth circuit of a high-frequency-signal transceiver circuit according to a third modification to the first embodiment. A first circuit to a third circuit and a fifth circuit to a sixth circuit of the high-frequency-signal transceiver circuit according to the third modification are the same as the first circuit 2 to the third circuit 4 and the fifth circuit 6 to the sixth circuit 7 of the high-frequency-signal transceiver circuit 1 according to the embodiment, and an illustration and description thereof are omitted.

Referring to FIG. 12, a fourth circuit 5C includes a 5GNR-signal and LTE-ultra-high-frequency-band-signal transceiver circuit 53C instead of the 5GNR-signal and LTE-ultra-high-frequency-band-signal transceiver circuit 53 (see FIG. 6). The fourth circuit 5C includes an eLAA-signal and WiFi-5-GHz-band-signal transceiver circuit 54C instead of the eLAA-signal and WiFi-5-GHz-band-signal transceiver circuit 54 (see FIG. 6).

A set of the 5GNR-signal and LTE-ultra-high-frequency-band-signal transceiver circuit 53C and the eLAA-signal and WiFi-5-GHz-band-signal transceiver circuit 54C is a single module. The present disclosure, however, is not limited thereto. The 5GNR-signal and LTE-ultra-high-frequency-band-signal transceiver circuit 53C and the eLAA-signal and WiFi-5-GHz-band-signal transceiver circuit 54C may be different modules.

The 5GNR-signal and LTE-ultra-high-frequency-band-signal transceiver circuit 53C further includes a power amplifier 311 unlike the 5GNR-signal and LTE-ultra-high-frequency-band-signal transceiver circuit 53.

The eLAA-signal and WiFi-5-GHz-band-signal transceiver circuit 54C includes the power amplifier 54i and the switch 54j instead of the power amplifier 54a, the switch 54b, the power amplifier 54c, and the switch 54d unlike the eLAA-signal and WiFi-5-GHz-band-signal transceiver circuit 54.

When an eLAA signal is transmitted, the switch 54j electrically connects the power amplifier 311 and the band pass filter 54e to each other. The power amplifier 311 receives the eLAA transmission signal from the RFIC 101 via the terminal 5j, amplifies the signal, and outputs the amplified eLAA transmission signal to the band pass filter 54e via the switch 54j. The band pass filter 54e passes the eLAA transmission signal amplified by the power amplifier 311 and outputs the signal to the high pass filter of the multiplexer 55.

When a signal in the WiFi-5-GHz band is transmitted, the switch 54j electrically connects the power amplifier 54i and the band pass filter 54e to each other. The power amplifier 54i receives the transmission signal in the WiFi-5-GHz band from the RFIC 103 via the terminal 5k, amplifies the signal, and outputs the amplified transmission signal in the WiFi-5-GHz band to the band pass filter 54e via the switch 54j. The band pass filter 54e passes the transmission signal in the WiFi-5-GHz band amplified by the power amplifier 54i and outputs the signal to the high pass filter of the multiplexer 55.

When an eLAA signal is received, or a signal in the WiFi-5-GHz band is received, the switch 54j electrically connects the band pass filter 54e and the low-noise amplifier 54f to each other. The band pass filter 54e receives the eLAA reception signal or the reception signal in the WiFi-5-GHz band from the high pass filter of the multiplexer 55, passes the signal, and outputs the signal to the low-noise amplifier 54f via the switch 54j. The low-noise amplifier 54f amplifies the eLAA reception signal and outputs the amplified eLAA reception signal to the RFIC 101 via the terminal 5l. The low-noise amplifier 54f amplifies the reception signal in the WiFi-5-GHz band and outputs the amplified reception signal in the WiFi-5-GHz band to the RFIC 103 via the terminal 5m.

In the fourth circuit 5 according to the first embodiment, the power amplifier 54c is used to amplify the eLAA transmission signal and the transmission signal in the WiFi-5-GHz band. Accordingly, there is a possibility that the fourth circuit 5 is not suitable to amplify the eLAA transmission signal and the transmission signal in the WiFi-5-GHz band.

In the fourth circuit 5C according to the third modification, the power amplifier 311 amplifies the eLAA transmission signal, and the power amplifier 54i amplifies the transmission signal in the WiFi-5-GHz band. Accordingly, the fourth circuit 5C is suitable to amplify the eLAA transmission signal and the transmission signal in the WiFi-5-GHz band.

The circuit structure of the 5GNR-signal and LTE-ultra-high-frequency-band-signal transceiver circuit 62 of the fifth circuit 6 may be the same as the circuit structure of the 5GNR-signal and LTE-ultra-high-frequency-band-signal transceiver circuit 53C of the fourth circuit 5C. Similarly, the circuit structure of the eLAA-signal and WiFi-5-GHz-band-signal transceiver circuit 63 of the fifth circuit 6 may be the same as the circuit structure of the eLAA-signal and WiFi-5-GHz-band-signal transceiver circuit 54C of the fourth circuit 5C.

The first modification and the third modification may be combined. That is, the eLAA-signal and WiFi-5-GHz-band-signal transceiver circuit 54C of the fourth circuit 5C according to the third modification may include the switch 54g of the eLAA-signal and WiFi-5-GHz-band-signal transceiver circuit 54A of the fourth circuit 5A (see FIG. 9) according to the first modification.

The fourth circuit 5C according to the third modification may not include the GPS-signal receiver circuit 51, and the fifth circuit 6 may include the GPS-signal receiver circuit 51.

Fourth Modification

Figure 13:
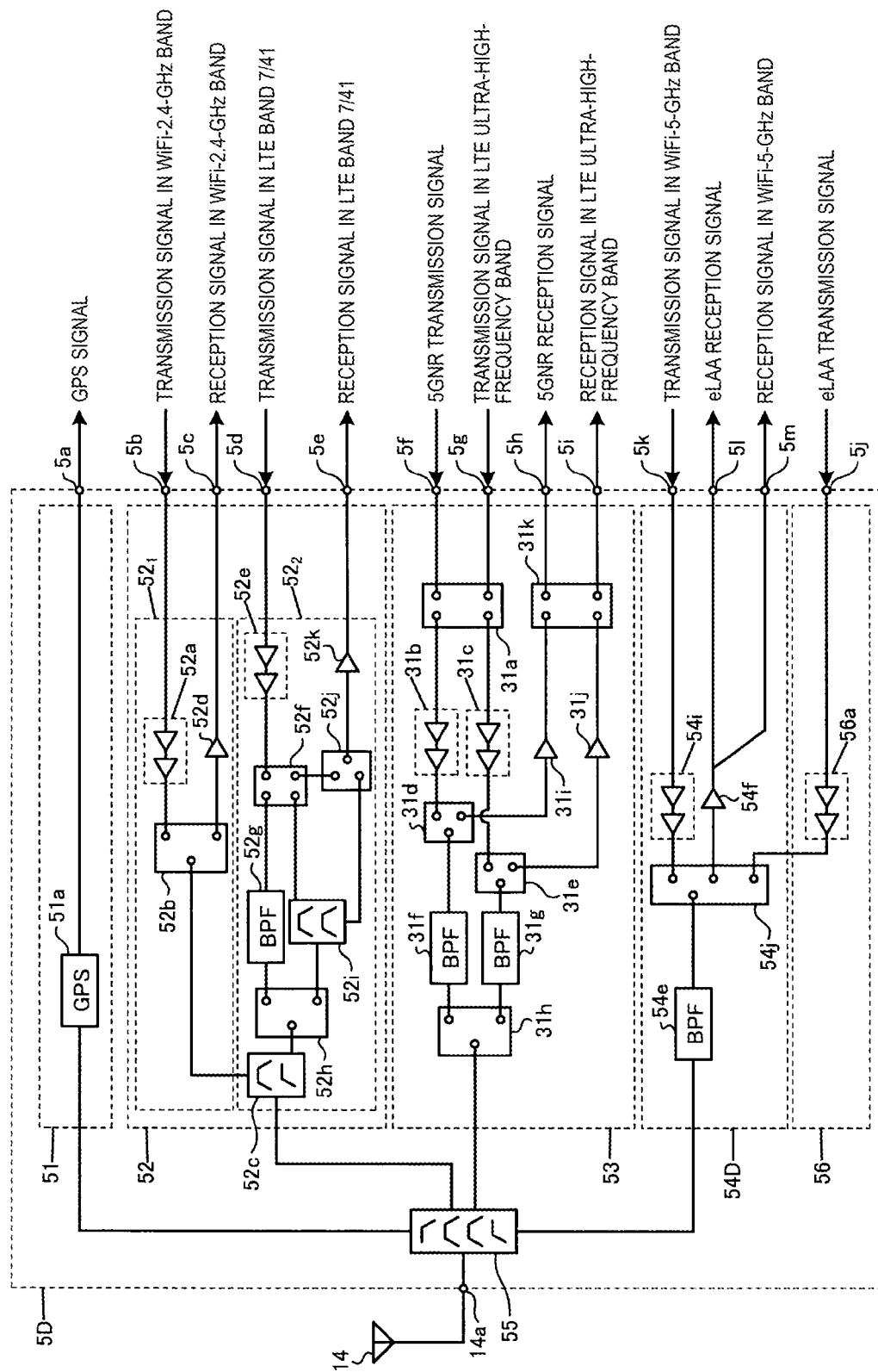
FIG. 13 illustrates the structure of a fourth circuit of a high-frequency-signal transceiver circuit according to a fourth modification to the first embodiment.

FIG. 13 illustrates the structure of a fourth circuit of a high-frequency-signal transceiver circuit according to a fourth modification to the first embodiment. A first circuit to a third circuit and a fifth circuit to a sixth circuit of the high-frequency-signal transceiver circuit according to the fourth modification are the same as the first circuit 2 to the third circuit 4 and the fifth circuit 6 to the sixth circuit 7 of the high-frequency-signal transceiver circuit 1 according to the embodiment, and an illustration and description thereof are omitted.

Referring to FIG. 13, a fourth circuit 5D includes an eLAA-signal and WiFi-5-GHz-band-signal transceiver circuit 54D instead of the eLAA-signal and WiFi-5-GHz-band-signal transceiver circuit 54 (see FIG. 6). The fourth circuit 5D further includes an eLAA-transmission-signal-amplifying circuit 56.

A set of the eLAA-signal and WiFi-5-GHz-band-signal transceiver circuit 54D and the eLAA-transmission-signal-amplifying circuit 56 is a single module. The present disclosure, however, is not limited thereto. The eLAA-signal and WiFi-5-GHz-band-signal transceiver circuit 54D and the eLAA-transmission-signal-amplifying circuit 56 may be different modules.

The eLAA-signal and WiFi-5-GHz-band-signal transceiver circuit 54D includes the power amplifier 54i and the switch 54j instead of the power amplifier 54a, the switch 54b, the power amplifier 54c, and the switch 54d unlike the eLAA-signal and WiFi-5-GHz-band-signal transceiver circuit 54.

The eLAA-transmission-signal-amplifying circuit 56 includes a power amplifier 56a.

When an eLAA signal is transmitted, the switch 54j electrically connects the power amplifier 56a and the band pass filter 54e to each other. The power amplifier 56a receives the eLAA transmission signal from the RFIC 101 via the terminal 5j, amplifies the signal, and outputs the amplified eLAA transmission signal to the band pass filter 54e via the switch 54j. The band pass filter 54e passes the eLAA transmission signal amplified by the power amplifier 56a and outputs the signal to the high pass filter of the multiplexer 55.

When a signal in the WiFi-5-GHz band is transmitted, the switch 54j electrically connects the power amplifier 54i and the band pass filter 54e to each other. The power amplifier 54i receives the transmission signal in the WiFi-5-GHz band from the RFIC 103 via the terminal 5k, amplifies the signal, and outputs the amplified transmission signal in the WiFi-5-GHz band to the band pass filter 54e via the switch 54j. The band pass filter 54e passes the transmission signal in the WiFi-5-GHz band amplified by the power amplifier 54i and outputs the signal to the high pass filter of the multiplexer 55.

When an eLAA signal is received, or a signal in the WiFi-5-GHz band is received, the switch 54j electrically connects the band pass filter 54e and the low-noise amplifier 54f to each other. The band pass filter 54e receives the eLAA reception signal or the reception signal in the WiFi-5-GHz band from the high pass filter of the multiplexer 55, passes the signal, and outputs the signal to the low-noise amplifier 54f via the switch 54j. The low-noise amplifier 54f amplifies the eLAA reception signal and outputs the amplified eLAA reception signal to the RFIC 101 via the terminal 5l. The low-noise amplifier 54f amplifies the reception signal in the WiFi-5-GHz band and outputs the amplified reception signal in the WiFi-5-GHz band to the RFIC 103 via the terminal 5m.

In the fourth circuit 5 according to the first embodiment, the power amplifier 54c is used to amplify the eLAA transmission signal and the transmission signal in the WiFi-5-GHz band. Accordingly, there is a possibility that the fourth circuit 5 is not suitable to amplify the eLAA transmission signal and the transmission signal in the WiFi-5-GHz band.

In the fourth circuit 5D according to the fourth modification, the power amplifier 56a amplifies the eLAA transmission signal, and the power amplifier 54i amplifies the transmission signal in the WiFi-5-GHz band. Accordingly, the fourth circuit 5D is suitable to amplify the eLAA transmission signal and the transmission signal in the WiFi-5-GHz band.

The circuit structure of the eLAA-signal and WiFi-5-GHz-band-signal transceiver circuit 63 of the fifth circuit 6 may be the same as the circuit structure of the eLAA-signal and WiFi-5-GHz-band-signal transceiver circuit 54D of the fourth circuit 5D. Similarly, the fifth circuit 6 may further include the eLAA-transmission-signal-amplifying circuit 56 of the fourth circuit 5D.

The first modification and the fourth modification may be combined. That is, the eLAA-signal and WiFi-5-GHz-band-signal transceiver circuit 54D of the fourth circuit 5D according to the fourth modification may include the switch 54g of the eLAA-signal and WiFi-5-GHz-band-signal transceiver circuit 54A of the fourth circuit 5A (see FIG. 9) according to the first modification.

The fourth circuit 5D according to the fourth modification may not include the GPS-signal receiver circuit 51, and the fifth circuit 6 may include the GPS-signal receiver circuit 51.

According to the present disclosure, a 4×4 MIMO structure of 5GNR is described. In the case of a 2×2 MIMO structure of 5GNR, two circuits of the four circuits supporting 5GNR can be removed.

Second Embodiment

Figure 14:
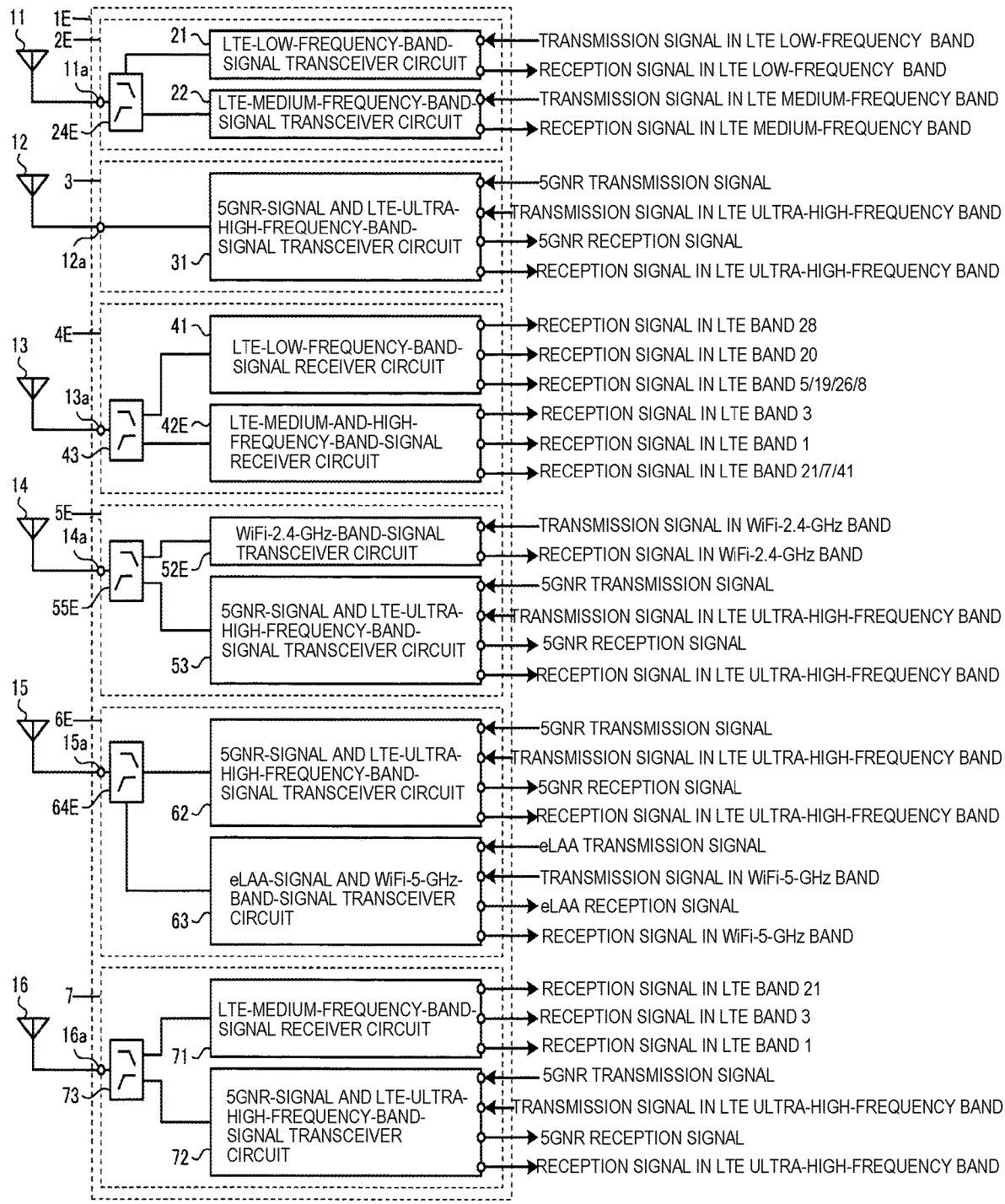
FIG. 14 illustrates the structure of a high-frequency-signal transceiver circuit according to a second embodiment.

FIG. 14 illustrates the structure of a high-frequency-signal transceiver circuit according to a second embodiment. Components according to the second embodiment which are the same as those according to the first embodiment and the first to fourth modifications are designated by like reference numbers, and a description thereof is omitted.

A high-frequency-signal transceiver circuit 1E includes a first circuit 2E instead of the first circuit 2.

The first circuit 2E includes the LTE-low-frequency-band-signal transceiver circuit 21, the LTE-medium-frequency-band-signal transceiver circuit 22, and a multiplexer 24E. The first circuit 2E does not include the LTE-high-frequency-band-signal transceiver circuit 23 unlike the first circuit 2.

The multiplexer 24E is a 1-to-2 diplexer. The multiplexer 24E electrically connects the first antenna terminal 11a and circuits such as the LTE-low-frequency-band-signal transceiver circuit 21 and the LTE-medium-frequency-band-signal transceiver circuit 22 to each other.

The multiplexer 24E includes a low pass filter and a high pass filter. The low pass filter passes a signal in the LTE low-frequency band. The high pass filter passes a signal in the LTE medium-frequency band.

The high-frequency-signal transceiver circuit 1E includes the second circuit 3.

The high-frequency-signal transceiver circuit 1E includes a third circuit 4E instead of the third circuit 4.

The third circuit 4E includes the LTE-low-frequency-band-signal receiver circuit 41 and a LTE-medium-and-high-frequency-band-signal receiver circuit 42E, and the multiplexer 43.

The high-frequency-signal transceiver circuit 1E includes a fourth circuit 5E instead of the fourth circuit 5.

The fourth circuit 5E includes a WiFi-2.4-GHz-band-signal transceiver circuit 52E, the 5GNR-signal and LTE-ultra-high-frequency-band-signal transceiver circuit 53, and a multiplexer 55E. The fourth circuit 5E does not include the eLAA-signal and WiFi-5-GHz-band-signal transceiver circuit 54 unlike the fourth circuit 5.

The multiplexer 55E is a 1-to-2 diplexer. The multiplexer 55E electrically connects the fourth antenna terminal 14a and circuits such as the WiFi-2.4-GHz-band-signal transceiver circuit 52E and the 5GNR-signal and LTE-ultra-high-frequency-band-signal transceiver circuit 53 to each other.

The multiplexer 55E includes a low pass filter and a high pass filter. The low pass filter passes a signal in the WiFi-2.4-GHz band. The high pass filter passes a 5GNR signal and a signal in the LTE ultra-high-frequency band.

The high-frequency-signal transceiver circuit 1E includes a fifth circuit 6E instead of the fifth circuit 6.

The fifth circuit 6E includes the 5GNR-signal and LTE-ultra-high-frequency-band-signal transceiver circuit 62, the eLAA-signal and WiFi-5-GHz-band-signal transceiver circuit 63, and a multiplexer 64E. The fifth circuit 6E does not include the LTE-medium-and-high-frequency-band-signal receiver circuit 61 unlike the fifth circuit 6.

The multiplexer 64E is a 1-to-2 diplexer. The multiplexer 64E electrically connects the fifth antenna terminal 15a and circuits such as the 5GNR-signal and LTE-ultra-high-frequency-band-signal transceiver circuit 62 and the eLAA-signal and WiFi-5-GHz-band-signal transceiver circuit 63 to each other.

The multiplexer 64E includes a low pass filter and a high pass filter. The low pass filter passes a 5GNR signal and a signal in the LTE ultra-high-frequency band. The high pass filter passes an eLAA signal and a signal in the WiFi-5-GHz band.

The high-frequency-signal transceiver circuit 1E includes the sixth circuit 7.

Figure 15:
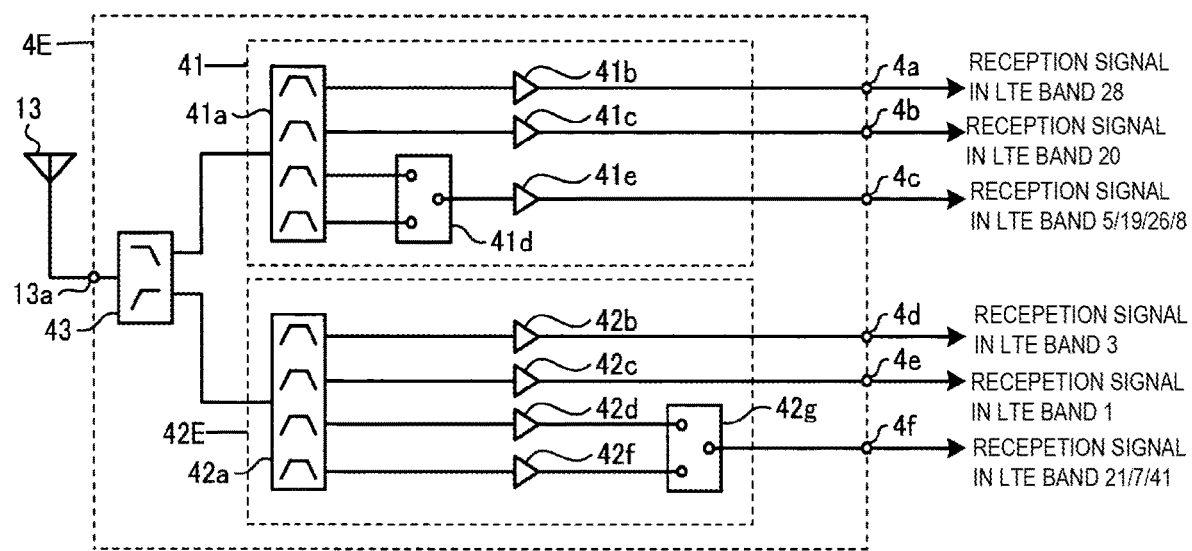
FIG. 15 illustrates the structure of a third circuit of the high-frequency-signal transceiver circuit according to the second embodiment.

FIG. 15 illustrates the structure of the third circuit of the high-frequency-signal transceiver circuit according to the second embodiment.

The LTE-medium-and-high-frequency-band-signal receiver circuit 42E includes none of the low-noise amplifier 42j, the switches 42e and 42i, and the power amplifier 42h unlike the LTE-medium-and-high-frequency-band-signal receiver and WiFi-2.4-GHz-band-signal transceiver circuit 42. The low-noise amplifier 42f is electrically connected to the multiplexer 42a.

Figure 16:
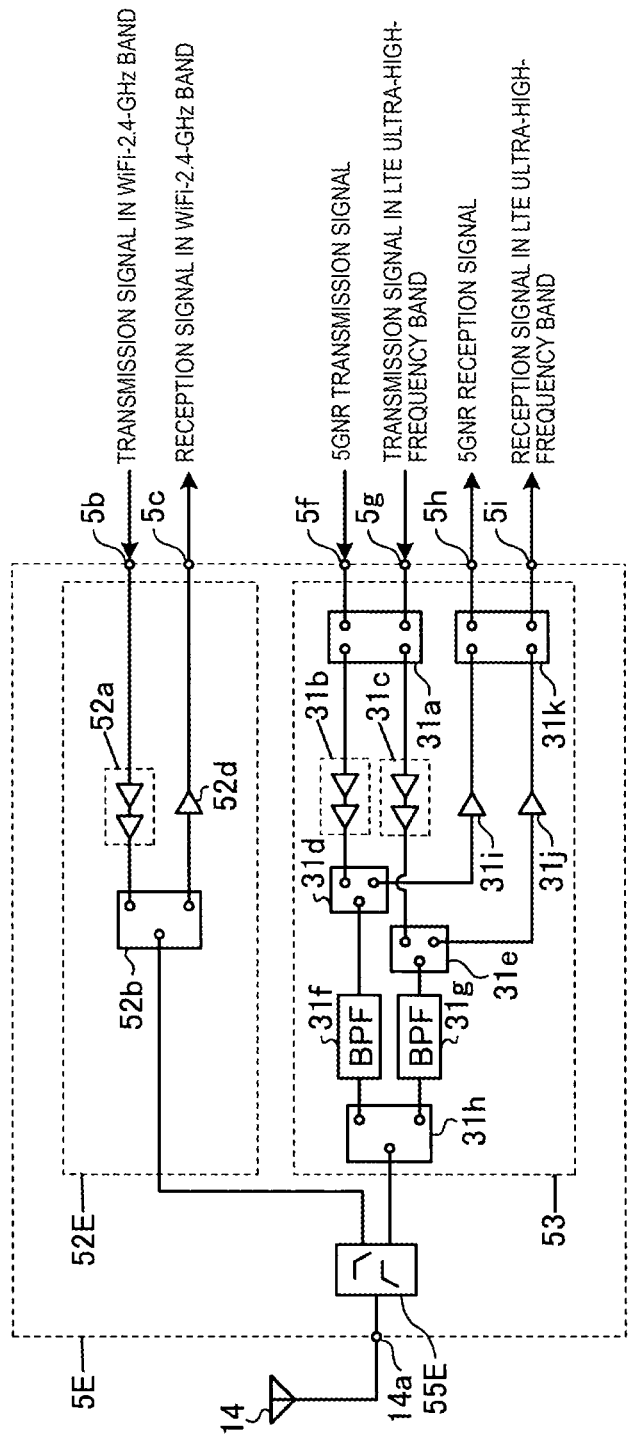
FIG. 16 illustrates the structure of a fourth circuit of the high-frequency-signal transceiver circuit according to the second embodiment.

FIG. 16 illustrates the structure of the fourth circuit of the high-frequency-signal transceiver circuit according to the second embodiment.

The WiFi-2.4-GHz-band-signal transceiver circuit 52E includes none of the power amplifier 52e, the switches 52f, 52h, and 52j, the multiplexers 52c and 52i, the low-noise amplifier 52k, and the band pass filter 52g unlike the LTE-high-frequency-band-signal and WiFi-2.4-GHz-band-signal transceiver circuit 52. The switch 52b is electrically connected to the multiplexer 55E.

The high-frequency-signal transceiver circuit 1E according to the second embodiment achieves the same effects as in the high-frequency-signal transceiver circuit 1 according to the first embodiment.

The embodiments are described above to make the present disclosure easy to understand and do not limit the present disclosure. The present disclosure can be modified and altered without departing from the spirit thereof. The present disclosure includes equivalents.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A high-frequency-signal transceiver circuit comprising:
    six antenna terminals;
    a plurality of terminals configured to connect to high-frequency circuits; and
    six circuits, each of the six circuits being connected to a different one of the six antenna terminals and at least one of the plurality of terminals,
    wherein a first of the six circuits transmits and receives only signals according to time division multiplexing communication, and
    wherein at least one of the six circuits comprises a 5GNR-signal transceiver circuit.

2. The high-frequency-signal transceiver circuit according to claim 1, wherein each of the six circuits comprises one or more power amplifiers configured to amplify a signal transmitted to a corresponding one of the six antenna terminals and one or more low-noise amplifiers configured to amplify a signal received from the corresponding one of the six antenna terminals.

3. The high-frequency-signal transceiver circuit according to claim 1, wherein a second of the six circuits comprises an LTE-low-frequency-band-signal transceiver circuit, an LTE-medium-frequency-band-signal transceiver circuit, and an LTE-high-frequency-band-signal transceiver circuit.

4. The high-frequency-signal transceiver circuit according to claim 1, wherein a second of the six circuits comprises an LTE-low-frequency-band-signal receiver circuit and an LTE-medium-and-high-frequency-band-signal receiver and WiFi-2.4-Ghz-band-signal transceiver circuit.

5. The high-frequency-signal transceiver circuit according to claim 1, wherein a second of the six circuits comprises a GPS-signal receiver circuit, an LTE-high-frequency-band-signal and WiFi-2.4-Ghz-band-signal transceiver circuit, a 5GNR-signal and LTE-ultra-high-frequency-band-signal transceiver circuit, and an eLAA-signal and WiFi-5-Ghz-band-signal transceiver circuit.

6. The high-frequency-signal transceiver circuit according to claim 1, wherein a second of the six circuits comprises an LTE-medium-and-high-frequency-band-signal receiver circuit, a 5GNR-signal and LTE-ultra-high-frequency-band-signal transceiver circuit, and an eLAA-signal and WiFi-5-Ghz-band-signal transceiver circuit.

7. The high-frequency-signal transceiver circuit according to claim 1, wherein a second of the six circuits comprises an LTE-medium-frequency-band-signal receiver circuit and a 5GNR-signal and LTE-ultra-high-frequency-band-signal transceiver circuit.

8. The high-frequency-signal transceiver circuit according to claim 1, wherein the first of the six circuits comprises a 5GNR-signal and LTE-ultra-high-frequency-band-signal transceiver circuit.

9. The high-frequency-signal transceiver circuit according to claim 1, wherein the 5GNR-signal and LTE-ultra-high-frequency-band-signal transceiver circuit is directly connected to one of the six antenna terminals with no multiplexer interposed therebetween.

10. The high-frequency-signal transceiver circuit according to claim 1, wherein a second of the six circuits comprises an LTE-low-frequency-band-signal transceiver circuit and an LTE-medium-frequency-band-signal transceiver circuit.

11. The high-frequency-signal transceiver circuit according to claim 1, wherein a second of the six circuits comprises an LTE-low-frequency-band-signal receiver circuit and an LTE-medium-and-high-frequency-band-signal receiver circuit.

12. The high-frequency-signal transceiver circuit according to claim 1, wherein a second of the six circuits comprises a WiFi-2.4-Ghz-band-signal transceiver circuit and a 5GNR-signal and LTE-ultra-high-frequency-band-signal transceiver circuit.

13. The high-frequency-signal transceiver circuit according to claim 1, wherein a second of the six circuits comprises a 5GNR-signal and LTE-ultra-high-frequency-band-signal transceiver circuit and an eLAA-signal and WiFi-5-Ghz-band-signal transceiver circuit.

* * * * *